(12) United States Patent
Harada et al.

(10) Patent No.: US 11,093,952 B2
(45) Date of Patent: Aug. 17, 2021

(54) INFORMATION DISPLAYING METHOD, INFORMATION DISPLAYING SYSTEM, INFORMATION DISPLAYING PROGRAM, AND METHOD FOR PROVIDING INFORMATION DISPLAYING PROGRAM

(71) Applicant: Panasonic Intellectual Property Corporation of America, Torrance, CA (US)

(72) Inventors: Shunji Harada, Osaka (JP); Kouji Miura, Osaka (JP); Aki Yoneda, Hyogo (JP); Tomohiko Kitamura, Osaka (JP); Kozo Nishimura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 660 days.

(21) Appl. No.: 14/378,414

(22) PCT Filed: Dec. 17, 2013

(86) PCT No.: PCT/JP2013/007398
§ 371 (c)(1),
(2) Date: Aug. 13, 2014

(87) PCT Pub. No.: WO2014/097613
PCT Pub. Date: Jun. 26, 2014

(65) Prior Publication Data
US 2015/0019286 A1    Jan. 15, 2015

(30) Foreign Application Priority Data
Dec. 19, 2012    (JP) .............................. JP2012-277473

(51) Int. Cl.
*G06Q 30/00*    (2012.01)
*G06Q 30/02*    (2012.01)
*G06F 16/28*    (2019.01)

(52) U.S. Cl.
CPC ....... *G06Q 30/0201* (2013.01); *G06F 16/285* (2019.01)

(58) Field of Classification Search
CPC .......... G06Q 30/0255; G06Q 30/0235; G06Q 10/105; G06Q 10/103; G06Q 10/067;
(Continued)

(56) References Cited

U.S. PATENT DOCUMENTS

2002/0059584 A1* 5/2002 Ferman ............. G06F 17/30017
725/34
2006/0053219 A1* 3/2006 Kutsumi ................ G06Q 30/02
709/224
(Continued)

FOREIGN PATENT DOCUMENTS

JP    10-164246    6/1998
JP    11-120473    4/1999
(Continued)

OTHER PUBLICATIONS

Bapat et al., User-sensitive Scheduling of Home Appliances, http://conferences.sigcomm.org/sigcomm/2011/papers/greennet/p43.pdf, Proceedings of the 2nd ACM SIGMCOMM workshop on Green networking (Year: 2011).*
(Continued)

*Primary Examiner* — Patricia H Munson
*Assistant Examiner* — Uche Byrd
(74) *Attorney, Agent, or Firm* — Wenderoth, Lind & Ponack, L.L.P.

(57) ABSTRACT

An information displaying method includes: obtaining, for each of users, usage history information items on one or
(Continued)

more appliances used by the user; calculating a utilization characteristic based on a usage history information item on a predetermined appliance among the one or more appliances used by a predetermined user among the users, the utilization characteristic being of the predetermined user using the predetermined appliance, and the usage history information item on the obtained predetermined appliance; obtaining, for each of the user, a post information item posted by the user; and displaying, in association with each other, (i) a utilization characteristic information item on the utilization characteristic calculated in the calculating and (ii) the post information item posted by the predetermined user, the utilization characteristic being of the predetermined user using the predetermined appliance, and the post information item being obtained in the obtaining of a post information item.

21 Claims, 27 Drawing Sheets

(58) Field of Classification Search
CPC .. G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | | | |
|---|---|---|---|---|
| 2007/0081696 | A1* | 4/2007 | Brennan | G07C 9/00158 382/115 |
| 2008/0306985 | A1* | 12/2008 | Murray | G06Q 10/10 |
| 2009/0062010 | A1 | 3/2009 | Iwata et al. | |
| 2009/0125382 | A1* | 5/2009 | Delepet | G06F 17/30864 705/347 |
| 2009/0327007 | A1 | 12/2009 | Imanishi | |
| 2009/0327085 | A1 | 12/2009 | Imanishi | |
| 2010/0082604 | A1* | 4/2010 | Gutt | G06F 17/30648 707/721 |
| 2013/0054166 | A1 | 2/2013 | Suzuki et al. | |
| 2013/0135116 | A1* | 5/2013 | Garbe | G08C 19/00 340/870.02 |

FOREIGN PATENT DOCUMENTS

| | | |
|---|---|---|
| JP | 2002-203168 | 7/2002 |
| JP | 2004-178453 | 6/2004 |
| JP | 2006-260561 | 9/2006 |
| JP | 2007-140637 | 6/2007 |
| JP | 2008-102936 | 5/2008 |
| JP | 2008-243088 | 10/2008 |
| JP | 2008-293362 | 12/2008 |
| JP | 2009-53904 | 3/2009 |
| JP | 2009-87073 | 4/2009 |
| JP | 2009-217671 | 9/2009 |
| JP | 2010-9507 | 1/2010 |
| JP | 2010-250623 | 11/2010 |
| JP | 2011-180686 | 9/2011 |
| JP | 2013-45229 | 3/2013 |

OTHER PUBLICATIONS

International Search Report dated Jan. 28, 2014 in International Application No. PCT/JP2013/007398.

* cited by examiner

FIG. 3

| Registered user information | | | Registered appliance information | |
|---|---|---|---|---|
| User ID | Password | User profile | Appliance ID | Appliance profile |
| User 10 | XXXXXXX | Residence: Osaka | Appliance A | Recorder |
| | | | Appliance B | Washing machine |
| User 30 | XXXXXXX | Residence: Hokkaido | Appliance E | Vacuum cleaner |

FIG. 4

| Appliance ID: Appliance A | | |
|---|---|---|
| Function | Use time and date | Setting/condition data |
| Recording | 2012/3/2 20:00-21:00 | Broadcasting station ID/Program information/ Scheduled recording mode (weekly)/Replayed/Remaining recording capacity |
| Recording | 2012/3/7 18:00-21:00 | Broadcasting station ID/Program information/ Scheduled recording mode (once)/Replayed/Remaining recording capacity |
| Editing | 2012/3/8 10:10-11:23 | Program information editing/Partial deleting/Dividing/Connecting/ Converting recording mode/Remaining recording capacity |
| Copying | 2012/3/8 11:30-12:15 | Program information/Copying to/Recording mode/ Remaining recording capacity |
| Recording | 2012/3/9 20:00-21:00 | Broadcasting station ID/Program information/ Scheduled recording mode (weekly)/Replayed/Remaining recording capacity |
| Editing | 2012/3/12 22:38-23:13 | Program information editing/Partial deleting/Dividing/Connecting/ Converting recording mode/Remaining recording capacity |
| Recording | 2012/3/13 20:00-21:00 | Broadcasting station ID/Program information/ Scheduled recording mode (once)/Unreplayed/Remaining recording capacity |
| Recording | 2012/3/16 20:00-21:00 | Broadcasting station ID/Program information/ Scheduled recording mode (weekly)/Unreplayed/Remaining recording capacity |
| Deleting | 2012/3/16 21:15-21:25 | Deleted program information/Remaining recording capacity |

FIG. 5

| Appliance ID: Appliance F | | |
|---|---|---|
| Function | Use time and date | Setting/condition data |
| Heating | 2012/3/2  9:00-16:30 | Operation mode/temperature and humidity setting/indoor temperature and outdoor temperature |
| Automatic | 2012/4/10  11:00-13:30 | Operation mode/temperature and humidity setting/indoor temperature and outdoor temperature |
| Dehumidifying | 2012/6/28  12:00-13:30 | Operation mode/temperature and humidity setting/indoor temperature and outdoor temperature |
| Air conditioning | 2012/7/28  9:00-17:30 | Operation mode/temperature and humidity setting/indoor temperature and outdoor temperature |

FIG. 6

| Appliance ID: Appliance G | | |
|---|---|---|
| Function | Use time and date | Setting/condition data |
| Stove | 2012/3/2 7:00-7:10 | Cooking time |
| Automatic | 2012/3/2 18:15-18:35 | Auto cook menu/cooking time |
| Stove | 2012/3/3 7:05-7:10 | Cooking time |
| Oven | 2012/3/3 12:11-12:31 | Cooking time |
| Grill | 2012/3/3 18:22-18:52 | Cooking time/auto cook menu |
| Automatic | 2012/3/4 18:40-19:20 | Auto cook menu/cooking time |

FIG. 7

| Appliance ID: Appliance B | | |
|---|---|---|
| Function | Use time and date | Setting/condition data |
| Washing and drying | 2012/3/2 9:30-10:30 | Course setting/Quantity of clothes (Large) |
| Washing | 2012/3/5 6:20-6:45 | Course setting/Quantity of clothes (Small) |
| Drying | 2012/3/6 6:20-6:30 | Course setting/Quantity of clothes (Small) |
| Washing and drying | 2012/3/9 9:10-10:00 | Course setting/Quantity of clothes (Medium) |

FIG. 8

| User ID | Password | User profile | Appliance ID | Appliance profile | Cooperation |
|---|---|---|---|---|---|
| User 10 | xxxxxx | Residence: Osaka | Appliance A | Maker A's recorder | Present |
|  |  |  | Appliance B | Maker A's washing machine | Present |
| User 30 | xxxxxx | Residence: Hokkaido | Appliance E | Maker B's vacuum cleaner | Present |
| User 20 | xxxxxx | Residence: Tokyo |  |  | Absent |

FIG. 9

| Appliance ID | Appliance A |
|---|---|
| Starting date of use | 2012/7/1 |
| Period of use (month) | Five months |
| Favorite performer/genre | AAA/bbb |

| Key function | Number of uses | | | | |
|---|---|---|---|---|---|
| | Accumulated number | Frequency of use | Present month | Last month | Month before last |
| Recording | 62 | Three times a week | 16 | 15 | 11 |
| Recording mode (High definition) | 42 | Twice a week | 12 | 8 | 7 |
| Recording mode (Standard definition) | 20 | Once a week | 3 | 4 | 4 |
| Editing | 5 | Once a month | 3 | 1 | 0 |
| Partially deleting | 5 | Once a month | 3 | 1 | 0 |
| Dividing and connecting | 0 | None a month | 0 | 0 | 0 |
| Copying | 4 | Once a month | 2 | 1 | 0 |
| Blu-ray | 4 | Once a month | 2 | 1 | 0 |
| DVD | 0 | None a month | 0 | 0 | 0 |
| Deleting | 25 | Once a week | 10 | 12 | 3 |

FIG. 10

| Favorite level of performer included in program information (point addition) | |
|---|---|
| Recorded (Standard definition) | +1 |
| Recorded (High definition) | +2 |
| Recorded and replayed | +1 |
| Edited | +2 or +5 |
| Copied (Blu-ray) | +3 |
| Copied (DVD) | +2 |

FIG. 11

|           | Casual                  | Heavy                                         | Regular                                              |
|-----------|-------------------------|-----------------------------------------------|------------------------------------------------------|
| Recording | Once a week or less     | Five times a week or more in last three months | More frequent than Casual and less frequent than Heavy |
| Editing   | Once a month or less    | Once a week or more in last three month       | More frequent than Casual and less frequent than Heavy |
| Copying   | Once a month or less    | Once a week or more in last three month       | More frequent than Casual and less frequent than Heavy |
| Total     | Satisfied all the above | Satisfied all the above                       | More frequent than Casual and less frequent than Heavy |

FIG. 12

| | Casual | Heavy | Regular |
|---|---|---|---|
| Recording | Frequency of use is in bottom 30% of frequency of use by all users. | Frequency of use is in top 10% of frequency of use by all users. | More frequent than Casual and less frequent than Heavy |
| Editing | | | More frequent than Casual and less frequent than Heavy |
| Copying | | | More frequent than Casual and less frequent than Heavy |
| Total | Satisfied all the above | Satisfied all the above | More frequent than Casual and less frequent than Heavy |

FIG. 13

| Cluster / Function | Recording | Editing | Copying | Using all functions |
|---|---|---|---|---|
| Recording | Once a week or more | None a week | None a week | Once a week or more |
| Editing | Once a month or less | Twice a month or more | Once a month or less | Twice a month or more |
| Copying | Once a month or less | Once a month or less | Twice a month or more | Twice a month or more |

FIG. 14

| Time period<br>Appliance | Use on weekday in daytime | Use on weekend and holiday |
|---|---|---|
| Recorder | Use time is over 50% on weekday in daytime for each function except scheduled recording. | Use time is over 50% on weekend and holiday for each function except scheduled recording. |
| Washing machine | | |
| Vacuum cleaner | | |
| Air conditioner | | |

FIG. 15

|  | Innovator | Early adopter | Early majority | Late majority | Laggard |
|---|---|---|---|---|---|
| Within what percentage of assumed users beginning with earliest starting date of use | 2.5 | 13.5 | 34 | 34 | 16 |

FIG. 16

| Title | Poster 1 | Guest |
|---|---|---|
| Posted time and day | | |
| I'm thinking about buying an appliance A. Tell me what you know about it. | | |
| Title | Poster 2 | Tyro |
| Posted time and day | | |
| I bought an appliance A the other day. Function B is not very good. | | |
| Title | Poster 3 | Pro |
| Posted time and day | | |
| I have switched to the new model of an appliance A from an old appliance. As soon as I got it, I tried all the functions. Thanks to the new function B, the new model is very comfortable. | | |

| Poster 1 | X minutes ago |
|---|---|
| I visited a XX *Denki* store for a launch event for a new product! | |
| Poster 2 | X hours ago |
| At a XX *Denki* store.　YY is on sale! | |
| Poster 3 | X days ago |
| Here is a review of YY from the magazine ZZ. | |

| View | Search | Profile |
|---|---|---|

FIG. 18

| Poster 1 | | Menu |
|---|---|---|
| Profile | | |
| Appliance A | ★ Pro | |
| Appliance B | ★ Tyro | |
| Subscribing | Poster 2, Poster 3··· | |
| Subscribed by | Poster 3, Poster 4··· | |
| | | |
| View | Search | Profile |

FIG. 19

| Enter | Appliance X |
|---|---|
| Search for post information on appliance X | |
| Search for user of appliance X | |

Past search history 1
Past search history 1
Past search history 1

| View | Search | Profile |

FIG. 20

| Poster 1 | X minutes ago |
|---|---|
| I visited a launch event for appliance X, a new product ! | |
| Poster 2 | X hours ago |
| At a XX *Denki* store. Appliance X is on sale! | |
| Poster 3 | X days ago |
| Here is a review of appliance X from the magazine ZZ. | |
| View | Search | Profile |

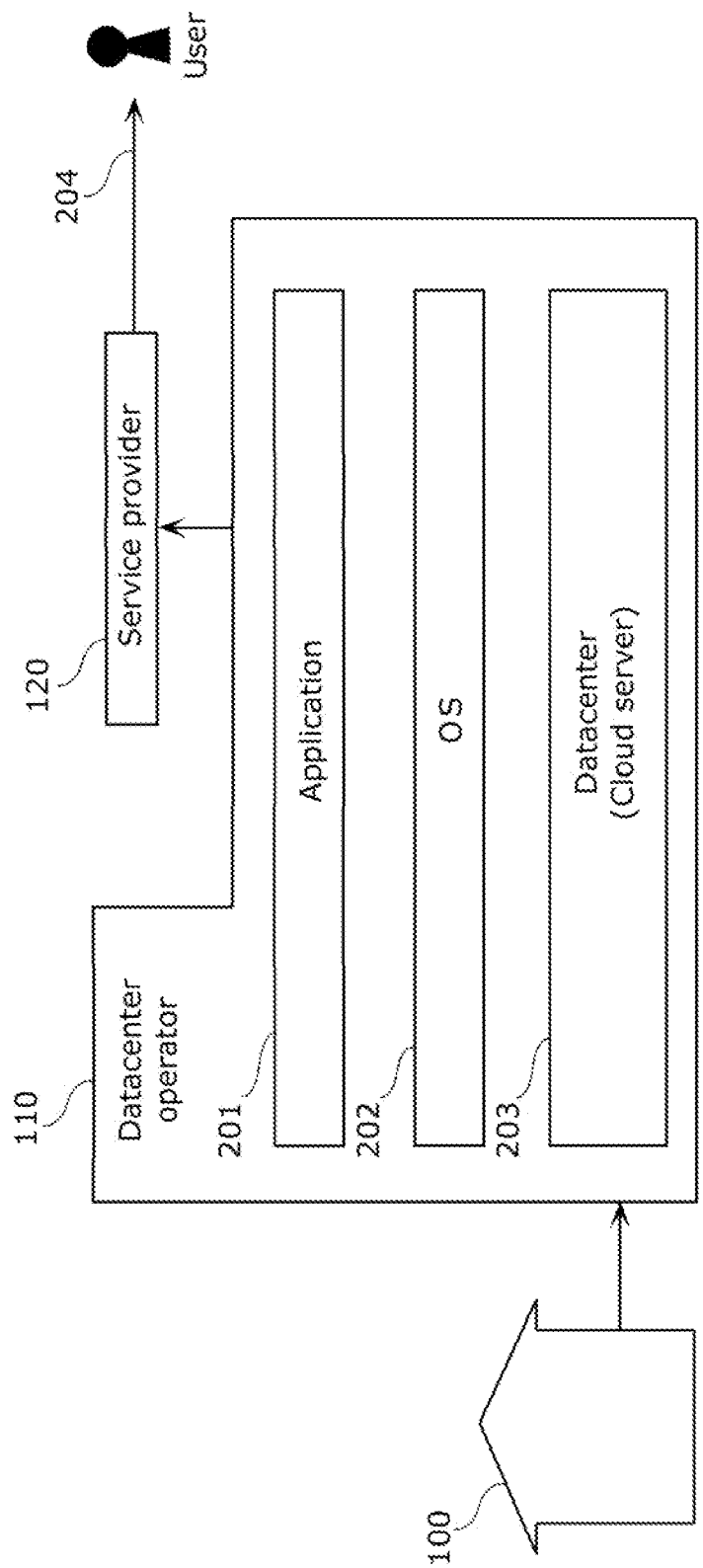

INFORMATION DISPLAYING METHOD, INFORMATION DISPLAYING SYSTEM, INFORMATION DISPLAYING PROGRAM, AND METHOD FOR PROVIDING INFORMATION DISPLAYING PROGRAM

TECHNICAL FIELD

The present invention relates to an information displaying method, an information displaying system, an information displaying program, and a method for providing the information displaying program which are used for an information sharing service among multiple users.

BACKGROUND ART

Conventional on-line merchandising systems provide a service for sharing review information on their merchandise among multiple users of a system. When, for example, a user purchases a commodity through one of those systems and posts review information on the commodity, the service displays in the review information a label which indicates that "the commodity purchased through the system" as one of benchmarks for the quality of the review information.

On the other hand, studies have been conducted to develop a technique which allows a user of a household appliance to understand for himself or herself a situation of the appliance, such as the usage of the appliance. For example, Patent Literature 1 discloses a system which collects from multiple households (users) utilization information (operating time and use frequency) on a household appliance, and announces to a predetermined user how the predetermined user himself or herself and the households utilize the appliance.

Moreover, Patent Literature 2 discloses a system which calculates a comprehensive learning level of a user for a household appliance, using individual learning levels, each for one of the functions of the household appliance, calculated from operating history information (use frequency for each of the functions) on the appliance, and displays to the user of the appliance the calculated individual and comprehensive learning levels and a recommended function to be learned.

CITATION LIST

Patent Literature

[PTL 1]
Japanese Unexamined Patent Application Publication No. 2008-102936
[PTL 2]
Japanese Unexamined Patent Application Publication No. 2008-243088

SUMMARY OF INVENTION

Technical Problem

On a service for sharing post information including review information and word-of-mouth information regarding appliances such as household appliances, however; no study has been conducted yet of a technique to display, based on usage histories of the appliances, post information which would be beneficial for each of users out of an enormous amount of post information.

The present invention is conceived in view of the above problem and aims to provide an information displaying method, an information displaying system, an information displaying program, and an method for providing the information displaying program which are used for displaying post information which would be beneficial for each of users.

Solution to Problem

In order to solve the above problem, an information displaying method according to the present invention includes: obtaining, for each of users, usage history information items on one or more appliances used by the user; calculating a utilization characteristic based on a usage history information item on a predetermined appliance among the one or more appliances used by a predetermined user among the users, the utilization characteristic being of the predetermined user using the predetermined appliance, and the usage history information item on the predetermined appliance being obtained in the obtaining of usage history information items; obtaining a post information item posted by the predetermined user; and displaying, in association with each other, (i) a utilization characteristic information item on the utilization characteristic calculated in the calculating and (ii) the post information item posted by the predetermined user, the utilization characteristic being of the predetermined user using the predetermined appliance, and the post information item being obtained in the obtaining of a post information item.

Such features make it possible to display, in association with each other, (I) a utilization characteristic information item on a utilization characteristic of a user using an appliance and (ii) a post information item posted by the user.

Advantageous Effects of Invention

An information displaying method of the present invention involves displaying, in association with each other, a posted information item posted by each of the users and a utilization characteristic information item on a utilization characteristic of the user using an appliance. Hence the user can easily search for and check a post information item posted by another user and a user information item on the other user whose user cluster is of the user's desire. In addition, the user can utilize the user cluster as a benchmark for judging the quality (such as benefit, reliability and fairness of the post information item) of the post information item.

BRIEF DESCRIPTION OF DRAWINGS

FIG. 3 represents an example of a user management table according to the embodiment.
FIG. 4 represents an example of a usage history management table of a recorder according to the embodiment.
FIG. 5 represents an example of a usage history management table of an air conditioner according to the embodiment.
FIG. 6 represents an example of a usage history management table of a microwave according to the embodiment.

FIG. 7 represents an example of a usage history management table of a washing machine according to the embodiment.

FIG. 8 represents an example of a user management table according to the embodiment.

FIG. 9 represents an example of a utilization characteristic according to the embodiment.

FIG. 10 represents an example of a favorite-level calculating table according to the embodiment.

FIG. 11 represents an example of a user determining table according to the embodiments.

FIG. 12 represents another example of the user determining table according to the embodiment.

FIG. 13 represents an example of a user cluster determining table based on a function which is disproportionally used according to the embodiment.

FIG. 14 represents an example of a user cluster determining table based on a time which is disproportionately spent on an appliance according to the embodiment.

FIG. 15 represents an example of a user cluster determining table based on a starting date of the use of an appliance according to the embodiment and the number of registered users of the appliance.

FIG. 16 represents an exemplary display which is provided in a message-board service according to the embodiment, FIG. 17 represents an exemplary display which appears on a browsing screen for post information in a real-time information sharing service according to the embodiment.

FIG. 18 represents an exemplary display which appears on a screen for profiles of posters posted on the real-time information sharing service according to the embodiment.

FIG. 19 represents an exemplary display which appears on a search screen for a real-time information sharing service according to the embodiment.

FIG. 20 represents an exemplary display of post information searched with a keyword in the real-time information sharing service according to the embodiment.

FIG. 27 represents Service Type 4 according to the embodiment.

Figure 1:
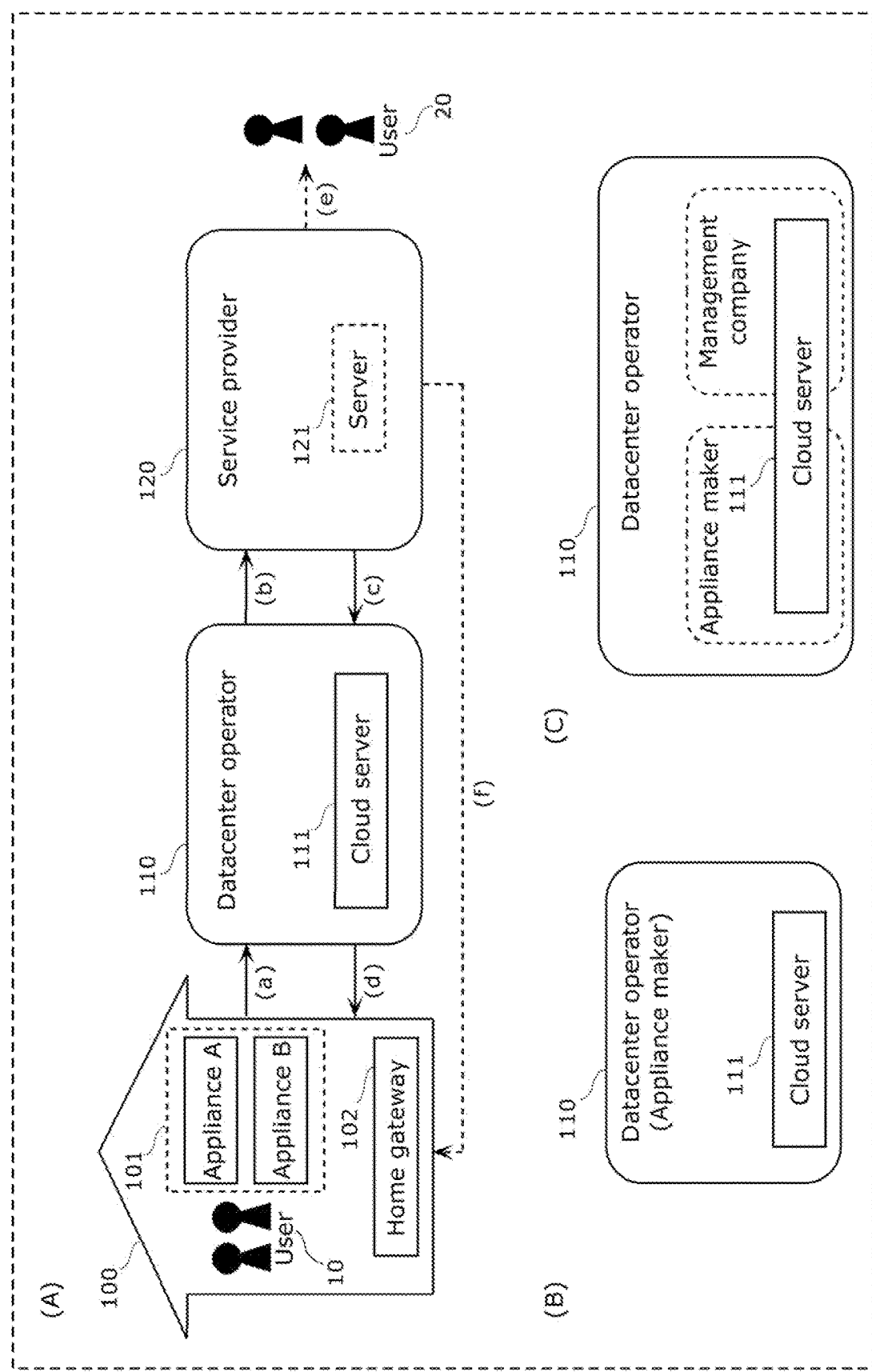
FIG. 1 represents an overall perspective of an information providing system.

DESCRIPTION OF EMBODIMENT (Underlying Knowledge Forming Basis of the Present Invention)

Studies have been conducted to develop a system for obtaining usage history information from appliances such as household appliances, and providing various services based on the obtained usage history information. Such a system would offer a service for sharing post information including review information and word-of-mouth information regarding the appliances including household appliances. On such a service, however, no study has been conducted yet of a technique to display, based on usage histories of the appliances, probably-beneficial post information for each of users out of an enormous amount of post information. In addition, no study has been conducted yet of a technique to offer a benchmark for judging usability (benefit), reliability (validity), and fairness of post information including review information and word-of-mouth information regarding the appliances.

In order to solve the above problem, an information displaying method according to the present invention includes: obtaining, for each of users, usage history information items on one or more appliances used by the user; calculating a utilization characteristic based on a usage history information item on a predetermined appliance among the one or more appliances used by a predetermined user among the users, the utilization characteristic being of the predetermined user using the predetermined appliance, and the usage history information item on the predetermined appliance being obtained in the obtaining of usage history information items; obtaining a post information item posted by the predetermined user; and displaying, in association with each other, (i) a utilization characteristic information item on the utilization characteristic calculated in the calculating and (ii) the post information item posted by the predetermined user, the utilization characteristic being of the predetermined user using the predetermined appliance, and the post information item being obtained in the obtaining of a post information item.

The above features make it possible to display, in association with each other, a post information item posted by a predetermined user and a utilization characteristic information item on a predetermined appliance used by the predetermined user. This allows a user to easily search for and check a post information item which matches a utilization characteristic information item of his or her desire, from among a very large number of post information items. As a result, the user can easily obtain a beneficial post information item (such as word-of-mouth information and information on malfunction) on the predetermined appliance, from, for example, another user who has the utilization characteristic information item that the user desires. In addition, the utilization characteristic information item can be utilized as a benchmark, which is more beneficial than the one in a conventional technique, for judging the quality (such as usability, reliability and fairness) of the post information item.

In addition, the information displaying method may further include obtaining user information items, each for one of the users, on the users, wherein, in the displaying, the utilization characteristic information item on the predetermined user using the predetermined appliance and a user information item on the predetermined user are further displayed in association with each other, the user information item being obtained in the obtaining user information items.

The above feature displays, in association with one another, a user information item on the predetermined user and a utilization characteristic information item on the predetermined appliance used by the predetermined user, as well as a post information item posted by the predetermined user. This allows a user to easily obtain a beneficial post information item (such as word-of-mouth information and information on malfunction) on the predetermined appliance from another user who has a utilization characteristic information item which matches a utilization characteristic information item of the user's desire, from among a very large number of post information items.

The information display method may further include determining a user cluster of the predetermined user using the predetermined appliance, based on the utilization characteristic of the predetermined user using the predetermined appliance wherein, in the displaying, the user cluster of the predetermined user using the predetermined appliance and the post information item posted by the predetermined user are displayed in association with each other, the user cluster representing the utilization characteristic information item and being determined in the determining.

The above features make it possible to determine a user cluster as a utilization characteristic information item on a predetermined appliance used by a predetermined user. This allows a user to judge usability, reliability, and fairness of a post information item posted by another user, using the user cluster representing an easy-to-understand benchmark.

In the calculating, frequency of use may be calculated as the utilization characteristic of predetermined user using the predetermined appliance, the frequency of use indicating how often the predetermined appliance is used in a predetermined period, and in the determining, the user cluster may be determined based on the frequency of use, calculated in the calculating, of the predetermined appliance in the predetermined period.

From among a large number of post information items, the above features allow a user to, for example, easily search for and check, for frequency of use of an appliance for a predetermined period, a post information item indicating frequency of use similar to the frequency of use of the appliance. As a result, a user can easily obtain a beneficial post information item (such as word-of-mouth information and information on malfunction) on the appliance from another user who uses the appliance in similar frequency of use. Furthermore, the features can determine, based frequency of use, an appropriate user cluster for, for example, a user who has spent a long time to achieve the predetermine number of uses but is low in frequency of use.

The predetermined period may be either (i) an accumulated use period between a starting date of use of the predetermined appliance and a present time or (ii) a most recent use period between the present time and a time point which is back from the present time for a predetermined period.

From among a large number of post information items, the above feature allows a user to, for example, easily search for, for example, a post information item posted by another user who has a predetermined tendency of use in the most recent use period. As a result, the user can easily obtain a beneficial post information item (such as word-of-mouth information and information on malfunction) on the appliance from, for example, the other user who uses the appliance in the predetermined tendency in the most recent use period.

In the calculating, a disproportion information item may be calculated as the utilization characteristic of the predetermined user using the predetermined appliance, the disproportion information item indicating how each of functions of the predetermined appliance is disproportionally used, and, in the determining, the user cluster may be determined based on the disproportion information item calculated in the calculating and indicating how each of the functions of the predetermined appliance is disproportionally used.

From among a large number of the post information items, the above features allows a user to, for example, easily search for, for a function of an appliance, a post information item posted by another user having a similar tendency of use, of the function, to the user's. As a result, the user can easily obtain a beneficial post information item (such as word-of-mouth information and information on malfunction) on the appliance from the other user whose tendency of use of the function is similar to that of the user.

In the calculating, a disproportion information item may be calculated as the utilization characteristic of the predetermined user using the predetermined appliance, the disproportion information item indicating in which time period the predetermined appliance is disproportionately used, and, in the determining, the user cluster may be determined based on the disproportion information item calculated in the calculating and indicating in which time period the predetermined appliance is disproportionately used.

From among a large number of the post information items, the above features allow a user to easily search for, for a use time of an appliance, a post information item posted by another user having a similar tendency of use, of the appliance, to the user's, for example. As a result, the user can easily obtain, for example, a beneficial post information item (such as word-of-mouth information and information on malfunction) on the appliance from the other user who uses the appliance in a use time similar to that of the user.

In the calculating, a starting date of use of the predetermined appliance may be calculated as the utilization characteristic of the predetermined user using the predetermined appliance, and, in the determining, the user cluster may be determined based on the starting date of use, of the predetermined appliance, calculated in the calculating.

The above features allow a user to easily search for from among a large number of post information items, a post information item posted by another user whose period of use of an appliance is the same or close to the period of use of the user's, for example. As a result, the user can easily obtain a beneficial post information item (such as word-of-mouth information and information on malfunction) on the appliance, from the other user who uses the appliance in a period of use similar to that of the user.

When the predetermined user uses an appliance group including the one or more appliances, in the determining, the user cluster of the predetermined user using the appliance group may be determined based on the utilization characteristic calculated in the calculating, the user cluster determined for each of the one or more appliances included in the appliance group used by the predetermined user.

From among a large number of post information items, the above features allow a user to easily search for a post information item posted by another user whose user cluster for an appliance group including multiple appliances is the same or similar to the user duster of the user. As a result, the user can easily obtain a beneficial post information item (such as word-of-mouth information and information on malfunction) on the appliance group from the other user who uses the same appliance group in a similar manner.

In the determining, the user cluster of the predetermined user using the predetermined appliance may be determined based (i) on the utilization characteristic of the predetermined user using the predetermined appliance, and (ii) on utilization characteristics on the predetermined appliance for all users using the predetermined appliance, the utilization characteristic and the utilization characteristics being calculated in the calculating.

The above feature makes it possible to determine a user cluster, based on the position of a utilization characteristic of a predetermined user using a predetermined appliance in relation to utilization characteristics for all the user using the predetermined appliance (relative position). As a result, from among a large number of post information items, a user can, for example, easily search for a post information item posted by another user based on the same relative position or a closer relative position.

In the displaying, either (i) a same screen may display the post information item posted by the predetermined user and the user cluster, determined in the determining, of the predetermined user using the predetermined appliance, or (ii) a screen for displaying the post information item posted by the predetermined user and a screen for displaying the user cluster may switchably appear.

From among a large number of post information items, the above feature allows a user to search for a post information item posted by another user whose user cluster is of the user's desire.

In the displaying, based on the user cluster, a post information item which is most suitable to the predetermined user may be further displayed from among post information items posted by the users.

From among a large number of post information items, the above features allows a user to search for a post information item posted by another user whose user cluster is of the user's desire.

The information displaying method may further include obtaining an input information item inputted by the predetermined user, wherein, in the displaying, the post information items posted by the users may further be searched based on the input information item and the user cluster, and a result of the search is further displayed.

From among a large number of post information items, the above features allow a user to search for a post information item posted by another user whose user cluster is of the user's desire.

In the displaying, either (i) a same screen may display at once the user information item on the predetermined user and the user cluster, determined in the determining, of the predetermined user using the predetermined appliance, or (ii) a screen for displaying the user information item on the predetermined user and a screen for displaying the user cluster may switchably appear.

From among a large number of user information items, the above feature allows a user to search for a user information item from another user whose user cluster is of the user's desire.

Further in the displaying, based on the user cluster, a user information item which is most suitable to the predetermined user may be displayed from among user information items on the users.

From among a large number of user information items, the above feature allows a user to search for a user information item from another user whose user cluster is of the user's desire.

The information displaying method may further include obtaining an input information item inputted by the predetermined user, wherein, further in the displaying, the user information items on the users are searched based on the input information and the user cluster, and a result of the search is displayed.

From among a large number of user information items, the above features allow a user to search for a user information item from another user whose user cluster is of the user's desire.

It is noted that the overall and specific aspects may be implemented in the form of a system, a computer program, or a computer-readable recording medium such as a CD-ROM, or any given combination thereof.

The embodiment below is a specific example of the present invention. The numerical values, constituent elements, steps, and an order of the steps all described in the embodiment are examples, and shall not limit the present invention. Hence, among the constituent elements in the embodiment, those not described in an independent claim representing the most generic concept of the present invention are introduced as non-mandatory ones. Each of the aspects in the embodiment may be combined one another.

(Overall Perspective of Service to be Provided)

The illustration (A) in FIG. 1 represents the overall perspective of an information providing system according to the embodiment.

<Schematic Structure of Group>

A group 100 is, for example, a corporation, an organization, or a household. The size of the group 100 is not considered. The group 100 includes an appliance group 101 having an appliance A and an appliance B, and a home gateway 102. The appliance group 101 includes an Internet-accessible appliance (such as a smartphone, a PC, and a TV). The appliance group 101 may include an appliance which is not accessible to the Internet by itself (such as a light, a washing machine, and a refrigerator). The home gateway 102 is a network device (such as a universal router) for providing a bridge between, for example, a wide area communications network such as the Internet and a local area network (LAN) such as a home network. In addition, the home gateway 102 may be a network device for providing a bridge between a wide area communications network such as the Internet and a device having a wireless communications capability such as Bluetooth (Registered) and specified low-power radio. In addition, the home gateway 102 may be capable of managing log information including usage history information on the appliances A and B. Furthermore, the home gateway 102 may be capable of controlling the appliances A and B in response to a direction from a user 10. Moreover, the group 100 includes the user 10 who uses the appliance group 101. Here the appliance group 101 in the group 100 includes the appliances A and B; instead, the appliance group 101 may include only one of the appliances A and B.

Here the Internet-accessible appliance may have, for example, a wireless LAN capability or a wired LAN capability. Through the LAN capability, the Internet-accessible appliance may be connected to the universal router and the like, and then to the Internet via the universal router and the like. Furthermore, among Internet-accessible appliances, mobile terminals such as smartphones and tablet computers may have communications capabilities to access cellular-phone communications networks such as the third generation of mobile telecommunications technology (3G) or the Long-Term Evolution (LTE). Such mobile terminals may be connected to the Internet via the cellular-phone communications networks. Moreover, an appliance which is not accessible to the Internet by itself may have, for example, a wireless communications capability such as Bluetooth (Registered) and specified low-power radio. Using the wireless communications capability, such an appliance may be connected to the home gateway 102, and then connected to the Internet via the home gateway 102. In addition, an appliance which is not accessible to the Internet by itself may have, for example, a short-range communications capability referred to as Near Field Communication (NFC). Such an appliance may be connected to a smartphone having the NFC capability and an NFC-enabled application installed therein in order to allow the smartphone to read the information regarding the appliance. Through the smartphone, the information regarding the appliance may be forwarded to a server which is connected to the Internet. It is noted that, when the NFC is used, the smartphone is passed over the appliance to hold communications between the smartphone and the appliance. The smartphone reads the information regarding the appliance.

<Schematic Structure of Datacenter Operator>

The datacenter operator 110 has a cloud server 111. The cloud server 111 is a virtual server which links with various appliances via the Internet. The cloud server 111 mainly manages any collection of data sets (big data) which is so large that it is difficult for a regular database management tool and the like to handle. Operations of the datacenter operator 110 include management of data and the cloud server 111, and operations of a datacenter which works on the management. Services provided by the datacenter operator 110 shall be detailed later. Here the datacenter operator 110 shall not be limited to a corporation which only manages data and operates the cloud server 111. For example, when an appliance maker which develops and manufactures one of the appliances in the appliance group 101 is also in charge of managing data and the cloud server 111, the appliance maker is the datacenter operator 110 (the illustration (B) in FIG. 1). In addition, the datacenter operator 110 shall not be limited to one corporation. For example, when an appliance maker and another management company collaborate or share tasks to manage data and operate the cloud server 111, one or both the maker and the company are the datacenter operator 110 (the illustration (C) in FIG. 1).

<Schematic Structure of Service Provider>

A service provider 120 has a server 121. Here the size of the server 121 is not considered. For example, the server 121 includes a device such as a memory in a personal PC. In addition, there is a case where the service provider 120 does not own the server 121.

It is noted that the home gateway 102 is not mandatory for the service. For example, in the case where every appliance in a house is connected to the Internet without a home gateway, the home gateway 102 is unnecessary.

Described next is how information flows in the above service.

First, each of the appliances A and B in the group 100 transmits log information, including usage history information of the appliance, to the cloud server 111 of the datacenter operator 110.

The cloud server 111 collects the log information including the usage history information on the appliances A and B (an illustration (a) in FIG. 1). Here the log information indicates, for example, an operating situation and an operating date of the appliance group 101. Exemplary operation situations and operating dates include a watching history of TV, scheduled recording information for a recorder, an operating time and date of a washing machine and an amount of the laundry, a date and time when a refrigerator was open and closed with how frequently. The log information, however, shall not be limited to the above situations and dates; instead, the log information may include all information obtainable from any appliance. Furthermore, the log information does not have to be obtained directly from an appliance; instead, the log information may include information which is indirectly obtainable via another appliance. For example, an operation of an appliance is monitored by another appliance such as a sensor and a monitoring camera, and the cloud server 111 may obtain the information on the operation of the appliance from the other appliance.

In some cases, the usage history information is directly provided from the appliance group 101 to the cloud server 111 without a home gateway. In addition, the usage history information may once be collected to the home gateway 102 from the appliance group 101, and then forwarded from the home gateway 102 to the cloud server 111.

The user 10 uses an appliance equipped with an input device, such as a smartphone, and transmits to the server 121 of the service provider 120 user information and post information. The user information is on the user 10 (identification information and profile information on the user himself or herself), and the post information (including post information which is unrelated to the appliance) includes review information and word-of-mouth information which are related to the appliance. Here the user information and the post information are transmitted from an appliance, such as a smartphone, to the server 121 of the service provider 120; instead, such information may be transmitted from an appliance, such as a smartphone, to the cloud server 111 of the datacenter operator 110, and then transmitted from the cloud server 111 to the server 121 of the service provider 120.

Next, the cloud server 111 of the datacenter operator 110 provides the collected usage history information by each certain unit to the service provider 120. Here the unit may be one which the datacenter operator 110 can organize the collected information into and provide to the service provider 120, and one which the service provider 120 requests. The above described usage history information is provided by each certain unit; however, the described usage history information does not have to be provided by a certain unit. In some cases, a unit of the provided usage history information can vary in amount, depending on a situation. As necessary, the usage history information is held in the server 121 owned by the service provider 120 (an illustration (b) in FIG. 1). Then, the service provider 120 provides a user with a service which organizes the usage history information into information which conforms to control for displaying the above described user information and post information, and, based on the organized information, displays the user information and the post information.

The user to which the service is provided may be the user 10 who uses the appliance group 101 and a user 20 who is an external user. In providing the service to a user, for example, the service may be directly provided to the user (see illustrations (e) and (f) in FIG. 1). Moreover, in providing the service to a user, for example, the service may be provided to the user by going through the cloud server 111 of the datacenter operator 110 again (see illustrations (c) and (d) in FIG. 1). Furthermore, the cloud server 111 of the datacenter operator 110 may organize the usage history information into information which conforms to a service to be provided to the user, and provide the organized information to the service provider 120.

It is noted that the user 10 and the user 20 may be the same or different from each other.

Embodiment

Figure 2:
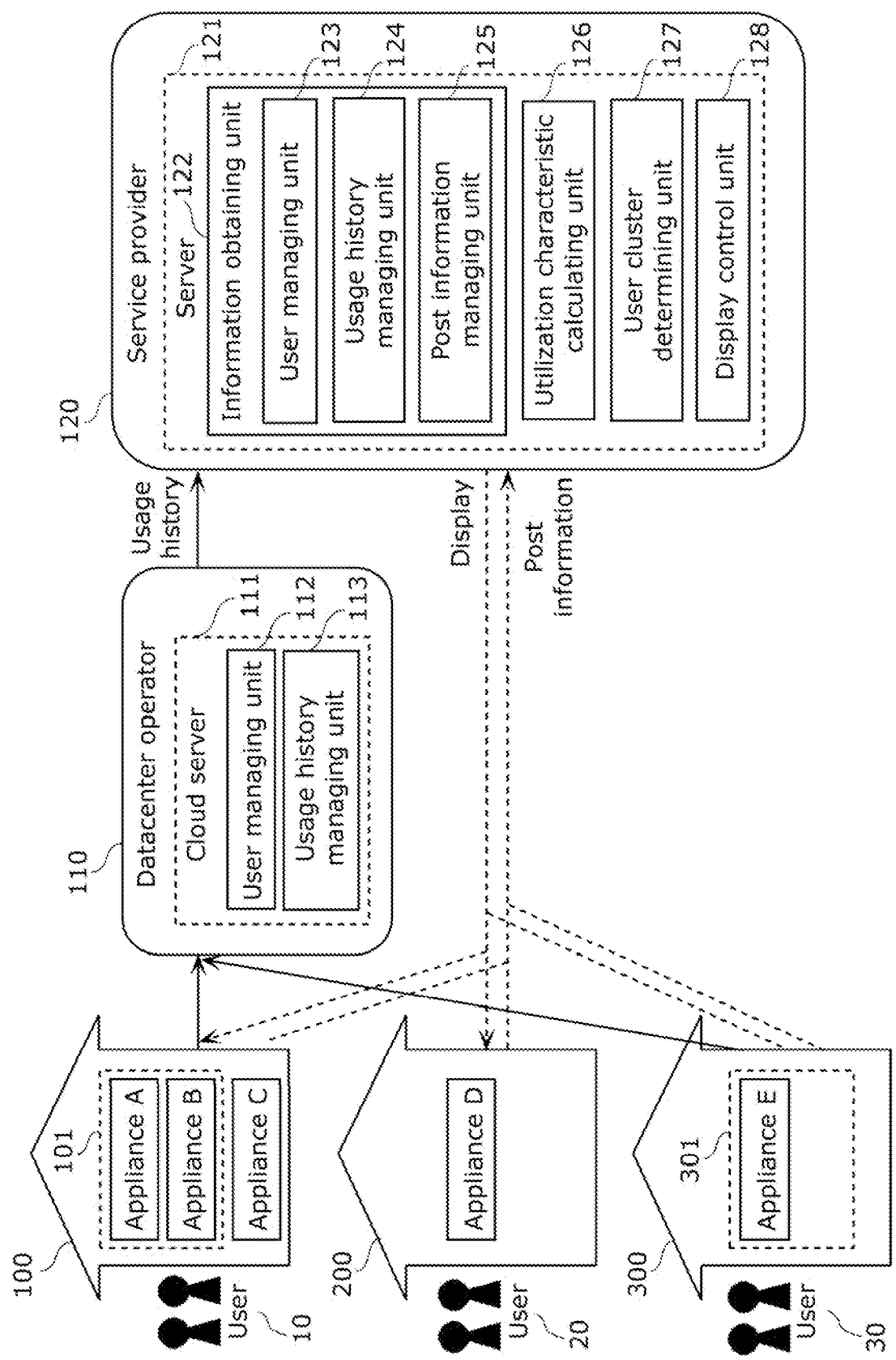
FIG. 2 represents a block diagram of the information providing system according to an embodiment.

FIG. 2 represents a block diagram of the information providing system according to an embodiment of the present invention.

<Structure of Groups>

As represented in FIG. 2, the information providing system according to the embodiment includes the group 100, a group 200, and a group 300.

The group 100 includes the appliances A and B which form the appliance group 101 that is registered in and managed by the cloud server 111 of the datacenter operator 110. Moreover, the group 100 includes an appliance C which is not managed by the cloud server 111 of the datacenter operator 110. In addition, the group 100 includes the user 10 who uses the appliance group 101 and the appliance C. A specific example of the structure of the appliance group 101 is the same as the one described above.

Furthermore, the group 200 includes an appliance D which is neither registered in nor managed by the cloud server 111 of the datacenter operator 110. Moreover, the group 200 includes a user 20 who uses the appliance D.

The group 300 includes an appliance E which forms an appliance group 301 that is registered in and managed by the cloud server 111 of the datacenter operator 110.

<Structure of Datacenter>

As represented in FIG. 2, the cloud server 111 of the datacenter operator 110 includes a user managing unit 112 and a usage history managing unit 113.

The cloud server 111 provides a service (hereinafter referred to as "usage history information management service") for managing usage history information on an appliance registered in the cloud server 111.

The user managing unit 112 manages, as a user management table, information on a user and an appliance registered in the usage history information management service. A structure of the user management table shall be described later.

The usage history managing unit 113 manages, as a usage history management table, the usage history information of the appliance registered in the usage history information management service. A structure of the usage history management table shall be described later.

[Data Structure of User Management Table in Cloud Server]

FIG. 3 represents an example of the user management table. As represented in FIG. 3, the user management table includes (i) information on a user himself or herself (user information), such as the user ID, the password, and the user profile of the user registered in the usage history information management service, and (ii) information on an appliance which the user uses (appliance information), such as the appliance ID and the appliance profile of an appliance registered in the usage history information management service.

<<User Information>>

Here the user ID is information for uniquely identifying a user in the system. The information includes, for example, the name, the nickname, the e-mail address, and any given character string of the user. The user managing unit 112 of the cloud server 111 may obtain a user ID when the user registers the user ID. If cooperating with another service and application, the user managing unit 112 may obtain the user ID from the service and the application. The user managing unit 112 may set any given character string which the system (in other words, the cloud server 111) can uniquely identify.

The password is, for example, an alphameric character which satisfies a predetermined condition. The user managing unit 112 may obtain a password when the user registers the password. The user managing unit 112 may set an numeric character which satisfies a predetermined condition for the system (in other words, the cloud server 111).

The user profile is information on the address, the nationality, the residence (prefectural and city government), the phone number, the e-mail address, the age, the sex, a hobby, and a preference (including a preference for the appliance) of a user. The user managing unit 112 may obtain a user profile when the user registers the user profile. If cooperating with another service and application, the user managing unit 112 may obtain the user profile from the service and application. The system (in other words, the cloud server 111) may register the user profile based on the usage history information for the user, <<Appliance Information>>

An exemplary appliance ID includes a serial No. for each appliance and a character string defined by the system. The appliance ID is information for uniquely identifying an appliance in the system. The user managing unit 112 of the cloud server 111 may obtain an appliance ID when the user registers the appliance ID. The system (in other words, the cloud server 111) may uniquely set the appliance ID. The appliance ID may be obtained from the usage history information.

An exemplary appliance profile includes the name of the maker that manufactured an appliance, the type of the appliance performance (such as introductory model, standard model, and high-performance model), the version number of the application OS/software, the model number, the model name, the brand name of the model, the series name of the model, and the category name of the model. The user managing unit 112 may obtain an appliance profile when the user registers the appliance profile. The system (in other words, the cloud server 111) may automatically register the appliance profile using the appliance serial No. and the like.

[Data Structure of Usage History Management Table in Cloud Server]

FIGS. 4 to 7 represent examples of usage history management tables. FIGS. 4, 5, 6, and 7 respectively represent examples of usage history management tables for a recorder, an air conditioner, a microwave, and a washing machine.

As represented in FIGS. 4 to 7, a usage history management table is created for each appliance, and formed of log information including usage history information such as an appliance ID, a usage date and history of each function, and setting/condition data of each function. It is noted that the usage history information includes not only for a function which the user carries out and sets, but also for a function which the appliance automatically carries out.

<Structure of Service Provider>

As represented in FIG. 2, the server 121 of the service provider 120 includes an information obtaining unit 122, a utilization characteristic calculating unit 126, a user cluster determining unit 127, and a display control unit 128.

The server 121 provides an information providing service for providing the user and a service provider with information on a poster and his or her post information, and information obtained when the information and the post information are searched and organized. The details of the information providing service shall be described later.

Here the "information on a poster" includes identification information and profile information on the poster. The "information on a poster" also includes post information and an everyday tweet which are unrelated to the appliance. In addition, the service provider may be, for example, a vender of an appliance and its related products, an advertiser of an appliance and its related products, and a search engine operator.

The information obtaining unit 122 includes a user managing unit 123, a usage history managing unit 124, and a post information managing unit 125.

The user managing unit 123 manages, as a user management table, information on a user and an appliance registered in the usage history information managing service.

The usage history managing unit 124 manages a usage history management table obtained from a usage history managing unit included in the cloud server 111 of the datacenter operator 110.

The post information managing unit 125 obtains post information and a user ID from an appliance (a smartphone, for example) used by each user. Here the post information includes review information and word-of-mouth information on an appliance, as well as post information and an everyday tweet which are unrelated to the appliance. The post information managing unit 125 may determine whether or not the post information is related to the appliance by obtaining, from the appliance (a smartphone, for example) used by each uses; the post information as well as information for identifying the appliance. In addition, the post information managing unit 125 may obtain (i) from the user managing unit 123 user profile information items each corresponding to one of obtained user IDs and (ii) from the after-described user cluster determining unit 127 user clusters each corresponding to one of the obtained user IDs. Then the post information managing unit 125 may manage each of the profile information items and user clusters.

In other word, the information obtaining unit 122 obtains, for each of the multiple users, usage history information items on one or more appliances used by the user and a post information item posted by the user. The information obtaining unit 122 further obtains, each for one of multiple users, a user information item on the users. The information obtaining unit 122 may further obtain an input information item inputted by a predetermined user.

Based on the user management table and the usage history management table for each of the appliances, the utilization characteristic calculating unit 126 calculates a utilization characteristic of each appliance. In other words, the utilization characteristic calculating unit 126 calculates a utilization characteristic based on a usage history information item on a predetermined appliance of a predetermined user among the users. Here the utilization characteristic is of the predetermined user using the predetermined appliance, and the usage history information item on the predetermined appliance is obtained by the information obtaining unit 122.

The user cluster determining unit 127 determines, based on the calculated utilization characteristic on the predetermined appliance, a user cluster of the predetermined appliance, using the user cluster determining table for the appliance, and manages the determined user cluster and a user ID corresponding to the user cluster. In other words, based on the utilization characteristic of a predetermined user using the predetermined appliance, the user cluster determining unit 127 determines the user duster of the predetermined user using the predetermined appliance.

The display control unit 128 controls how to display post information items, obtained and managed by the post information managing unit 125, to a user registered in the information providing service. In other words, the display control unit 128, acting as an information displaying unit, displays, in association with each other, (i) a utilization characteristic information item on the utilization characteristic calculated by the utilization characteristic calculating unit 126 and (ii) a post information item posted by the predetermined user. Here the utilization characteristic is of a predetermined user using a predetermined appliance, and the post information is obtained by the information obtaining unit 122. Here the display control unit 128 may display, in association with each other, (i) the user cluster of the predetermined user using the predetermined appliance and (ii) the post information item posted by the predetermined user. Here the user cluster represents the utilization characteristic information item, and is determined by the user cluster determining unit 127. In addition, the display control unit 128 may display the utilization characteristic information item and the user information item on the predetermined user associated with each other. It is noted that the display control unit 128 displays, on a displaying unit, the post information item and the user information item on the user, by generating an image to be displayed on the displaying unit. The displaying unit is of a home appliance such as a TV having a displaying unit, and of an information terminal such as a smartphone and a PC which are accessible to the information providing service. It is noted that that "display in association with each other" is, for example, to display multiple information items associated with each other on a single screen. In other words, associatively displaying a utilization characteristic information item and a post information item with each other is, for example, to display the utilization characteristic information item and the post information item on the same screen. Associatively displaying a utilization characteristic information item and a user information item with each other is, for example, to display the utilization characteristic information item and the user information item on a single screen. In addition, that "display in association with each other" is to switchably display between two screens one of which displays one of multiple information items and the other of which displays another one of the multiple information items.

Moreover, if the post information managing unit 125 associates a post information item with an appliance and manages the post information, the display control unit 128 may display, in association with each other, the post information items with a user cluster, among user clusters of the user who has posted the post information item, on the appliance associated with the post information item. In other words, the display control unit 128 may display, in association with each other, (i) a utilization characteristic information item on a utilization characteristic and (ii) a post information item. Here, calculated by the utilization characteristic calculating unit 126, the utilization characteristic is of a predetermined user using a predetermined appliance, and obtained from the information obtaining unit 122, the post information item is on the predetermined appliance used by the predetermined user.

[Information Providing Service and Usage History Information Management Service]

Here the information providing service provided by the service provider 120 and the usage history information management service provided by the above-described datacenter operator 110 are to cooperate with each other. In other words, with the agreement of the user, information on the user is to be transmitted to the service provider 120, the information being managed by the cloud server 111 of the datacenter operator 110, included in the user management table and the usage history management table, and representing the user.

Moreover, the user who registers himself or herself in the usage history information management service provided by the datacenter operator 110 may also use the same user ID and password for the registration, and register himself or herself, in cooperation with the usage history information management service, in the information providing service provided by the service provider 120.

[Data Structure of User Management Table in Server]

FIG. 8 represents an example of a user management table in a server. As represented in FIG. 8, the user management table includes user information, appliance information, and cooperation information. The user information is on the user himself or herself and includes the user ID, the password, and the user profile of the user registered in the information providing service. The appliance information is on an appliance which is registered in the information providing service and to be used by the user, and includes the appliance ID, and the appliance profile of the appliance. The cooperation information indicates the presence or absence of the cooperation between the information providing service provided by the service provider 120 and the usage history information management service provided by the datacenter operator 110.

In the user management table in FIG. 8, the users 10 and 30 whose "information indicating presence or absence of cooperation" is "Present" are registered in cooperation with the usage history information management service provided by the datacenter operator 110. Here, with the agreement of each of the users, the user information on the users 10 and 30, such as their user IDs, passwords, and user profiles, and appliance IDs and appliance profiles of their appliances, can be obtained from the cloud server 111, and the details of the user information and the appliance profiles can be rendered the same as the details of the user table for the user managing unit 112 in FIG. 3. Moreover, in the user management table in FIG. 8, the user 20 whose "information indicating presence or absence of cooperation" is "Absent" is registered only in the information providing service provided by the service provider 120 (not registered in the usage history management service). In other words, the user 20 does not have his or her information providing service associated with the usage history information management service.

[Calculating Utilization Characteristic on Each Appliance]

FIG. 9 represents an example of utilization characteristics on a recorder.

In the example in FIG. 9, the utilization characteristics include the following: a starting date of use, a period of use, a favorite performer, the accumulated number of uses of the key functions of the recorder, such as recording, editing, copying, and deleting, frequency of use of the key functions of the recorder, and the number of recent uses of the key functions of the recorder (present month, last month, month before last). It is noted that the utilization characteristics shall not be limited to these; instead, the utilization characteristics may include an accumulated use time and an average use time (an average use time per day, per week, or per month) of key functions of the recorder. In other words, the utilization characteristic calculating unit 126 may calculate the following as a user characteristic: of the predetermined user using the predetermined appliance: frequency of use indicating how often the predetermined appliance is used in a predetermined period; a disproportion information item indicating how each of the functions of the predetermined appliance is disproportionately used, and a disproportion information item indicating in which time period the predetermined appliance is disproportionately used; and a starting date of the use of the predetermined appliance. Here the "predetermined period" is either (i) an accumulated use period between the starting date of the use of the predetermined appliance and the present time or (ii) a most recent use period between the present time and a time point which is back from the present time for a predetermined period.

Here the starting date of the use of the recorder is obtained from the least recent use time and date in the usage history management table. A period of use is obtained from the least recent use time and date and the most recent use time and date in the usage history management table.

In addition, based on the use time and date and setting/condition data for each of the functions recorded on the usage history management table, the utilization characteristic calculating unit 126 calculates the accumulated number of the uses of each function from the starting date of use of the function to the present time, the average frequency of the use per month or per week, the number of the recent uses (present month, last month, month before last), etc. Moreover, the utilization characteristic calculating unit 126 uses a predetermined favorite-level calculating table to calculate the user's favorite performer from performers in recorded, edited, copied and/or deleted program information included in the usage history management table, and the user's favorite program genre from genre information on programs (such as variety short, vie, music, and news).

Here FIG. 10 represents an example of the predetermined favorite-level calculating table. When the recording mode in recording is of standard definition, as represented in FIG. 10, the program genre and each of the performers of a program to be recorded receive one point for the favorite level. Similarly, when the recording mode in recording is of high definition, the program genre and each of the performers of the program to be recorded receive two points for the favorite level, and receive another one point when the program is reproduced after the recording. In addition, when the program genre and each of the performers included in the program information to be edited receive two points for the favorite level, and there is a performer who can be identified in a time period left after edition (in other words, a portion included in the recorded program and left undeleted after the edition), the performer receives another five points for the favorite level. Furthermore, when a medium to which the program is copied is of Blu-ray (registered), the program genre and each of the performers included in the program information receive another three points for the favorite level. When a medium to which the program is copied is a DVD, the program genre and each of the performers receive another two points for the favorite level. Then the utilization characteristic calculating unit 126 calculates the points for the favorite level for each performer and genre based on the usage history information in the usage history management table. For example, the utilization characteristic calculating unit 126 calculates a performer and a program genre ranked at the top in point for the favorite level as a favorite performer and program genre.

Here the exemplified utilization characteristics are those of a recorder. The utilization characteristics on a microwave, an air conditioner, and a washing machine are also similar to those of a recorder. In other words, the utilization characteristics include an appliance ID, a starting date of use, a period of use, a favorite setting, a favorite course, a favorite recipe, and the accumulated number of uses, frequency of use, the number of the recent uses of key functions for each appliance (present month, last month, month before last), etc.

[Determining User Cluster]

The user cluster determining unit 127 may determine user clusters such as, for example, "casual user", "regular user", and "heavy user" based on the frequency of the use of each function. The user cluster determining unit 127 may also determine user clusters such as "user of specific function only" and "user of all functions" based on disproportionate uses of functions. Moreover, the user cluster determining unit 127 may determine user clusters such as "user for less than three years", "user for three years to five years", and "user for six years and more" based on the period of the use of an appliance.

The user cluster determining unit 127 may determine user clusters such as "weekday daytime user" and "weekend and holiday user" based on a disproportion information item indicating in which time period an appliance is disproportionally used. The user cluster determining unit 127 may also determine user clusters such as "innovator", "early adopter", "early majority", "late majority", and "laggard" based on the starting date of the use of an appliance, and the number of registered users of the appliance. Furthermore, the user cluster determining unit 127 may determine user clusters such as "user loyal to specific maker" and "user with no preference to specific maker (or user who is hopping between makers)" using disproportion information items on makers of all the registered appliances (or a specific appliance category, such as a recorder which the user has used until now). Furthermore, in the case where, for the above-described recorder, points for the favorite level have been calculated for a predetermined performer and program genre as a utilization characteristic, the user cluster determining unit 127 may determine user clusters such as "user's favorite performer" if the points for favorite level for the predetermined performer and program satisfy a predetermined condition.

In other words, the user duster determining unit 127 may determine a user cluster based on (i) frequency of use calculated by the utilization characteristic calculating unit 126, and indicating how often the predetermined appliance is used in a predetermined period, (ii) a disproportion information item indicating how a function of the predetermined appliance is disproportionately used, (iii) a disproportion information item indicating in which time period the predetermined appliance is disproportionately used, and (iv) a starting date of the use of the predetermined appliance.

FIGS. 11 and 12 represent examples of the user duster determining tables created for a recorder based on the frequency of the use of each of the functions.

In the example in FIG. 11, the user cluster determining unit 127 determines that, if the frequency of the use of the recording function is once a week or fewer, the user is a casual user of the recording function for the recorder. It is noted that the frequency of the use of the recording function per week is calculated by dividing the accumulated number of the uses of the recording function from the starting date of the use of the recorder to the present time by the number of weeks from the starting date of the use of the recorder to the present time. User clusters on the editing function and the copying function are determined in a similar manner as that of the recording function. Then, in the case of determining that the user is a casual user for all the recording function, editing function, and copying function of the appliance, the user cluster determining unit 127 determines that the user cluster for the appliance is a user cluster of the casual user. In other words, here, the user cluster determining unit 127 determines that the casual user is the total (overall) user cluster for the appliance (recorder) for each of the functions.

It is noted that, in this example, the user cluster determining unit 127 utilizes the frequency of the use of each function (the frequency of use per predetermined period, such as month and week) for determining the user cluster; however, the determination shall not be limited to this. For example, in determining the user cluster, the user cluster determining unit 127 may use the accumulated number of the uses of each function from the starting date of the use of the appliance to the present time.

In determining user dusters such as the casual user, the regular user, and the heavy user, however, the frequency of use representing the number of uses per predetermined period is more appropriate than the accumulated number of uses that is unrelated to timeline. This is because, for example, there is a user who has spent a long time to achieve the predetermine number of uses but is low in frequency of use. In reality, it would be appropriate to consider that such a user should be determined as a casual user. In other words, if the accumulated number of uses is utilized for the determination of a user cluster for such a user, the determined user cluster will inevitably be for the regular user. Instead, if the frequency of use is utilized for the determination of a user cluster, the determined user cluster will be of the casual user, which contributes to an appropriate determination.

In the example in FIG. 11, furthermore, in the case where the frequency of the use of the recording function is five times a week or more for every week in the last three months, the user cluster determining unit 127 determines that the user cluster is of the heavy user for the recording function of the recorder. It is noted that the frequency of use of the recording function for every week in the last three months may be calculated by dividing the number of the uses of the recording function in every month by the number of weeks in every month, or by dividing the number of the uses of the recording function in the last three months by the number of weeks in the last three months. User clusters on the editing function and the copying function are determined in a similar manner as that of the recording function. Then, in the case where the determination result shows that the user is a heavy user for all the recording function, editing function, and copying function of the appliance, the user cluster determining unit 127 determines that the user cluster for the appliance is the heavy user. In other words, here, the user cluster determining unit 127 determines that the heavy user is the total (overall) user cluster for the appliance (recorder) for each of the functions.

It is noted that, in this example, the user cluster determining unit 127 utilizes the frequency of the use of each function (the frequency of use per predetermined period, such as month and week) for determining the user cluster; however, the determination shall not be limited to this. For example, in determining the user cluster, the user cluster determining unit 127 may use the accumulated number of the uses of each function from the starting date of the use of the appliance to the present time.

In determining user clusters such as the casual user, the regular user, and the heavy user, however, the frequency of use representing the number of uses per recent predetermined period is more appropriate than the accumulated number of uses that is unrelated to timeline. This is because, for example, there is a user who has achieved the predetermined number of uses as an accumulated number of uses due to his or her high frequency of use in the past. In reality, if the user is low in recent frequency of use, it would be appropriate to consider that such a user should not be determined as a heavy user. In other words, if the accumulated number of uses is utilized for the determination of a user cluster for such a user, the determined user cluster will inevitably be of the heavy user even though the recent frequency of use is low. Instead, if the recent frequency of use is utilized for the determination of a user cluster, the determined user cluster will be of the regular user and the determination of the user cluster will be appropriately made.

Then, in the example in FIG. 11, the user duster determining unit 127 determines that a user who is neither a casual user nor a heavy user is a regular user.

FIG. 12 represents another example of the user duster determining table. In the example in FIG. 12, the user cluster determining unit 127 determines, using the utilization characteristics of all the users who register a recorder in the service, that, for the recording function of the appliance, if a user's frequency of the use of the recording function of the appliance is in the bottom 30% of the frequency of the use of the recording function by all the users of the registered appliance, the user is a casual user. Moreover, for example, the user cluster determining unit 127 determines, using the utilization characteristics of all the users who register the recorder in the service, that, for the recording function of the appliance, if a user's frequency of the use of the recording function in the last three months is in the top 10% of the frequency of the use of the recording function by all the users of the registered appliance, the user is a heavy user. Then, in the example in FIG. 12 as well, the user cluster determining unit 127 determines that a user who is neither a casual user nor a heavy user is a regular user. In other words, the user cluster determining unit 127 may determine a user cluster of a predetermined user using the predetermined appliance, based on a utilization characteristic of the predetermined user using the predetermined appliance and on utilization characteristics on the predetermined appliance for all the users using the predetermined appliance. Here the utilization characteristics are calculated by the utilization characteristic calculating unit 126. It is noted that the determination of the casual user is made when the frequency of use is in the bottom 30%, and the determination of the heavy user is made when the frequency of use is in the top 10%; however, those figures are examples, and another figure may be used.

FIGS. 13, 14, and 15 each represent a user duster determining table based on the following one of the items: how each of the functions is disproportionally used; in which time period an appliance is disproportionally used; and the starting date of the use of an appliance and the number of registered user of the appliance.

It is noted that, as represented in FIG. 14, the user cluster determining unit 127 may determine a user cluster for a group of appliances, using the utilization characteristic on an appliance in combination with the utilization characteristic on another appliance.

In addition, if a device in use (new appliance) is a replacement of another device (old appliance), and both the devices belong to the same appliance category, the user cluster determining unit 127 may reflect the utilization characteristic on the old appliance in determining the user cluster for the new appliance. In the example in FIG. 11, the user cluster determining unit 127 may utilize, for the last three months, the utilization characteristic on the new appliance for the present month, and the utilization characteristics on the old appliance for the last two months. As the example represents, if an appliance is changed to another one—that is, for example, if an old appliance is replaced with a new one—, during a predetermined period while user cluster determining unit 127 is calculating a utilization characteristic, the user cluster determining unit 127 may calculate the utilization characteristic regardless of the change of the appliances.

[Information Providing Service: (1) Message-Board Service]

The service provider 120 may provide, as an information providing service, a message-board service for posting review information and word-of-mouth information on each of the appliances. It is noted that the message-board service may be provided as an independent service, and as one of other services. For example, the message-board service may be provided as one of online sales services of an appliance.

FIG. 16 represents an example of a message board for an appliance. Here, on a display unit for an information terminal and a home electrical appliance connected to the message board, the display control unit 128 arranges and displays post information items posted by each of posters on the appliance in chronological order. Then, along with the post information items, the display control unit 128 displays images indicating identification information items 901 each representing a user cluster, identifying a poster, for the appliance. For example, if a post information item is posted by a poster whose total user cluster for the appliance is the heavy user, the display control unit 128 displays, in association with each other, an identification information item having the word "pro" and the post information item, as represented in FIG. 16. Furthermore, if a user cluster of a poster who posted the post information item is of the casual user (beginner), the display control unit 128 displays, in association with each other, an identification information item having the word "tyro" and the post information item. Moreover, if a user is a guest user—who is registered in the information providing service of a poster who has posted a post information but is not using the appliance—, the display control unit 128 associates an identification information item having the word "guest" with the post information item, and displays both the information items.

It is noted that the identification information items for the user clusters shall not be limited to these; instead, the identification information items may be provided in any given form (such as letter, mark, icon, character, medal, trophy, point, and the number of stars) as far as the user clusters can be identified.

Here the poster's name may be provided in any given form, such as an icon set by the poster and a picture of the poster, as far as the poster can be identified.

When displaying a post information item in the example in FIG. 16, the display control unit 128 executes control to display an identification information item corresponding to the user cluster of a poster along with the post information item.

Hence the display control unit 128 displays an identification information item for a user cluster along with a post information item. This feature allows a viewer of posted messages to check the user duster, for the appliance, of the poster who has posted the post information item.

Such display control can provide people with the following guideline to judge the quality of a post information item (reliability, usability, and fairness): The post information item is reliable because it is posted by a poster whose user cluster is of the "heavy user"; other post information items might have to be checked for a while before judgment of reliability is made because the post information item is posted by a poster whose user cluster is of the "casual user"; and the post information item is judged as a fair and no-biased one because it is posted by a poster whose user cluster is of the "user with no preference to specific maker".

It is noted that, in the example in FIG. 16, the display control unit 128 displays the information for identifying a user cluster on the same screen as post information is displayed; however, display of the information shall not be limited to this. For example, the display control unit 128 does not display the both kinds of information on the same screen. Instead, the display control unit 128 may display, on the screen, only the post information item and the poster's name. When a viewer selects (clicks on or touch the screen) the information on the poster on the screen, the display control unit 128 may display, on another screen, detailed information on the user cluster of the poster. In other words, the display control unit 128 may either (i) display, on the same screen, a post information item posted by the predetermined user and a user cluster determined by the user cluster determining unit 127 of the predetermined user using a predetermined appliance or (ii) switchably display a screen for displaying a post information item posted by the predetermined user and a screen for providing the user duster. Furthermore, the display control unit 128 may either (i) display, on the same screen, a user information item on the predetermined user and a user cluster, determined by the user cluster determining unit 127, of a predetermined appliance used by the predetermined user or (ii) switchably display a screen for displaying the user information on the predetermined user and a screen for displaying the user cluster.

It is noted that, in the example in FIG. 16, the display control unit 128 displays post information items in chronological order; instead, the display control unit 128 may control (prioritize) the order of display, depending on the user clusters. For example, post information items may be displayed in the order of higher frequency of use: a post information item in the heavy user, a post information item in the regular user, a post information item in the post information item, and a post information item in the guest user in that order. In addition, the display control unit 128 may have a unit for searching only for a post information item in a specific user cluster, and display the search result.

Moreover, when a viewer of posted messages views a posted message on a predetermined appliance, the display control unit 128 may display, as a priority, a post information item or a user information item posted by a poster whose user cluster for the appliance is identical, close, or similar to the user cluster of the viewer using the predetermined appliance. The display control unit 128 may search for and display such a post information item and a user information item.

Furthermore, when a viewer of posted messages views a posted message on a predetermined appliance, the display control unit 128 may display, as a priority, a post information item or a user information item posted by a poster whose multiple user clusters of the appliance are the same as the multiple user dusters of the viewer using the appliance. For example, when a user owns a washing machine and his or her user clusters are of the "heavy user" and "user for 5 years or more", the display control unit 128 may display, as a priority, a post information item posted by a user whose user clusters are the same for the washing machine; namely, the "heavy user" and "user for 5 years or more". The display control unit 128 may also search for and display such a post information item. Hence, based on a user cluster, the display control unit 128 may display the post information item that is most suitable to a predetermined user, from among post information items posted by multiple users. Furthermore, based on a user cluster, the display control unit 128 may display the user information item that is most suitable to a predetermined user, from among user information items posted by multiple users.

The example in FIG. 16 represents the case where a message board is provided for each appliance; instead, the example is applicable to the case where a message board is provided for each appliance group. Here, the appliance group is a group of appliances which belong to the same category (for example, multiple appliances of the same kind, such as recorder, air conditioner, microwave, washing machine, vacuum cleaner, TV, etc., and the recorder includes recorders having basic features, recorders having standard features, and recorders having high-end features), and to the same category and the same maker. Here the user cluster determining unit 127 may determine a user cluster representing an appliance group, from identification information items for user clusters for all the appliances which are registered by a poster and belong to the appliance group.

Then the display control unit 128 may display the determined user cluster. Suppose a case where a user registers the appliance A, the appliance B, and the appliance C, and each of user clusters for one of the appliances A, B, and C is respectively the heavy user, the heavy user, and the casual user. When the user posts a message on a message board for an appliance group including the appliances A, B, and C, the user duster to be displayed may be the heavy user by the majority. It is noted that the determination by the majority is an example; instead, among user clusters for multiple appliances, the user cluster on the highest level may be displayed (even though only one of the user clusters is of the heavy user, the user cluster to be displayed is of the heavy user), and the user cluster may be displayed together with the appliance ID. In other words, when a predetermined user uses an appliance group including one or more appliances, the user cluster determining unit 127 may determine a user cluster of the predetermined user using the appliance group, based on the utilization characteristic calculated by the utilization characteristic calculating unit 126. Here the user cluster is determined for each of the appliances included in the appliance group used by the predetermined user.

[Information Providing Service: (2) Real-Time Information Sharing Service]

As an information providing service, the service provider 120 may provide a service to share a post information item posted by each of the users on a real-time basis. With the agreement of each of the users, the service publicizes at least part of a user cluster, utilization characteristics, etc. for each of the appliances registered by the user. Then, with reference to the publicized user cluster, utilization characteristic, etc., a viewer follows a user of his or her interest (registers to subscribe post information items posted by the user), so that the viewer can subscribe and view a post information item posted by the user on a real-time basis. It is noted that, in this service, post information items do not have to be on a registered appliance. Instead, the post information items may be on an appliance of the user's interest, and may include an everyday tweet which is unrelated to the registered appliance.

FIG. 17 represents an exemplary display which appears on a browsing screen in this service.

In this example, post information items posted by followed multiple users are arranged and displayed in chronological order so that the most recent post information item comes to the top. When a poster's name is selected (clicked or touched) on the browsing screen, a profile screen of the poster is displayed, as represented in FIG. 18, and the profile of the poster, an appliance of his or hers, and a user cluster for each of appliances are displayed. Moreover, when the menu is selected, a function for following or unfollowing the poster becomes available.

Here it is noted that multiple post information items are arranged and displayed on a real-time basis; however, the arrangement and display does not have to be limited on a real-time basis. Based on a similarity among (i) an appliance registered by a browsing user, (ii) a user cluster for the browsing user's appliance, (iii) an appliance registered by the poster, and (iv) the user cluster for the poster's appliance, a post information item posted by a poster having a higher similarity is given priority to be displayed on a higher level in display order. In addition, a post information item posted by a poster having a higher similarity may be highlighted. Here the poster's name may be provided in any given form, such as an icon set by the poster and a picture of the poster, as far as the poster can be identified.

Here it is noted that described here is the case where the user manually follows a poster of his or her interest; however, following a poster shall not be limited to this. For example, the service may provide a feature to automatically follow users each other, depending on a similarity between user clusters, of the users, for each appliance.

Furthermore, when a user registers a predetermined appliance, the user may be informed of a user information item on another user whose user cluster is the same as the user cluster of the user for the predetermined appliance. Such a user information item may be displayed as a recommended user to be followed.

Moreover, when the "search" at the bottom is selected, a search screen in FIG. 19 is displayed. This allows a keyword to be entered to conduct a search. When the search is performed, a post information item in FIG. 20 and hit with the keyword is displayed. in addition, it is possible to search for a user (poster) that hit with a keyword. Moreover, the search can be conducted with an appliance and a user cluster, as well as any given keyword. Hence, the viewer can easily find out and follow a user who registers the same appliance as the viewer has. In other words, the information obtaining unit 122 may, as a fourth obtaining step, obtain either an input information item inputted by a predetermined user (an information item indicating a keyword or an information item indicating that an appliance or a user cluster has been selected). Then the display control unit 128 may search post information items posted by multiple users based on the input information item and the user cluster, and display the result of the search. Moreover, the display control unit 128 may search user information items on multiple users based on an input information item and a user cluster, and display the result of the search.

In addition, when the "profile" at the bottom is selected, displayed is a profile screen which is similar to one in FIG. 18 and represents the viewer himself or herself.

Furthermore, when the "view" at the bottom is selected, the screen is switched from either the "search" screen or the "profile" screen to the "view" screen.

[Example of Another Service]

The server of the service provider in the embodiment can display, in association with each other, either a user information item or a post information item and a user cluster, and manage the information items.

Taking advantage of the association and the management, the service provider may extract, based on a user cluster, a user information item and a post information item required by outside service operators, such as a vender of an appliance and its related products, an advertiser of an appliance and its related products, and a search engine operator. Then the service provider may provide its service.

<Processing Flow>

Described next is a processing flow in the embodiment.

[1. Processing Flow of User Register Processing Executed by User]

Figure 21:
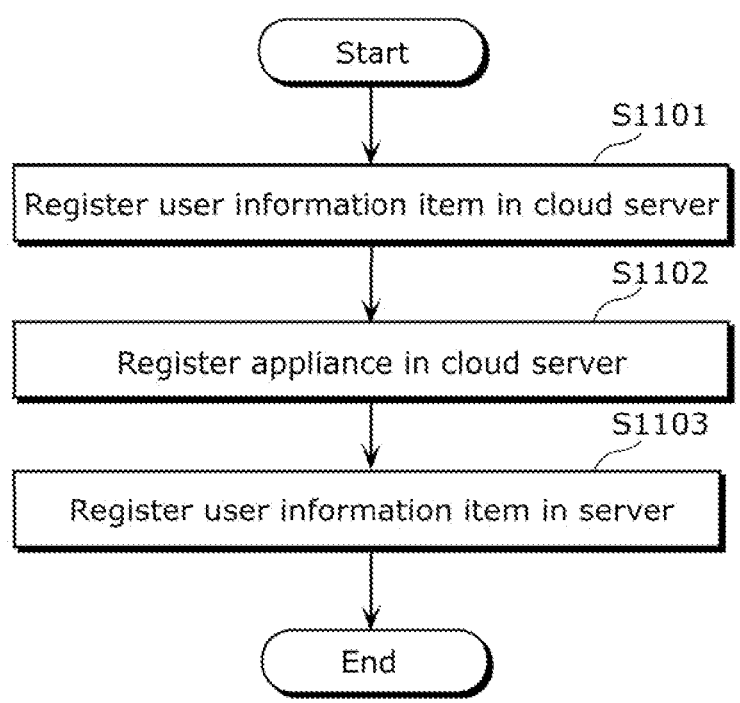
FIG. 21 represents a processing flow for user registration according to embodiment.

Described first is a processing flow illustrating how the user 10 in FIG. 2 registers himself or herself in the usage history information management service provided by the cloud server 111 of the datacenter operator 110 (see FIG. 21).

Using the appliance C—that is a smartphone—, the user registers, in the cloud server 111, a user information item (registration of the user) such as the user ID and the password (Step S1101).

Using the appliance C, the user 10 registers, in the cloud server 111, an appliance in use (registration of the appliance) (Step S1102).

It is noted that the above processing flow is an example, and shall not be limited to this.

Described next is how the user 10 in FIG. 2 registers himself or herself in the information providing service provided by the server 121 of the service provider 120.

Using the appliance C—that is a smartphone—, the user registers, in the server 121, a user information item (registration of the user) such as the user ID and the password (Step S1103).

It is noted that the password is used for the user registration in the above steps S1102 and S1103; however, the user registration shall not be limited to this. An alternative to the password may be, for example, an information item on a physical feature, such as one on a finger print of the user. In addition, any given information is acceptable as far as the information allows authentication of the user.

[2. Processing Flow of Usage History Information Management Service by Cloud Server]

Figure 22:
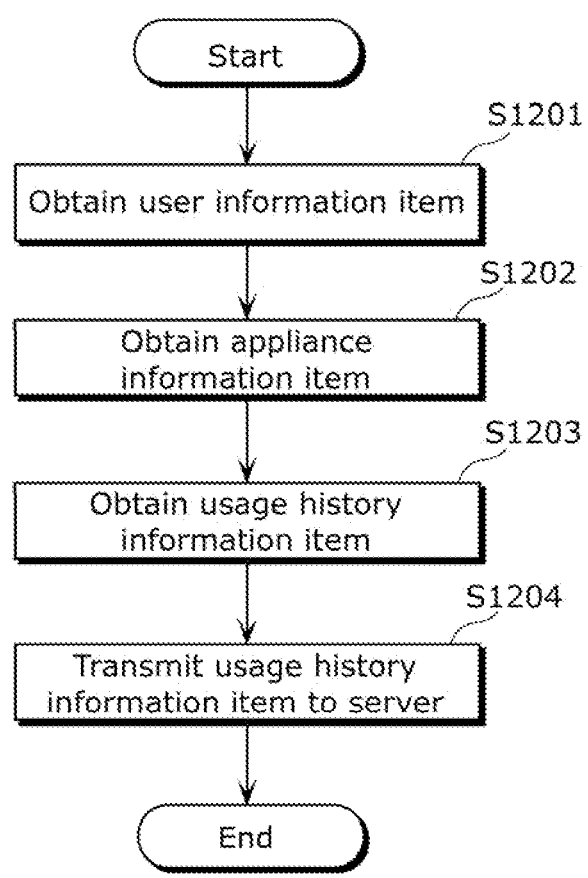
FIG. 22 represents a processing flow of a cloud server according to embodiment.

Described next is a processing flow in the cloud server 111 of the datacenter operator 110 in FIG. 2, using the user 10 as an example (see FIG. 22).

In the cloud server 111, the user managing unit 112 obtains, from the appliance C used by the user 10, an information item on the user 10, such as the user ID and the password, and then manages the information item with (stores the information in) a user management table (registration of the user) (Step S1201).

Furthermore, the user managing unit 112 obtains, from the appliance C used by the user 10, an appliance information item such as the appliance ID as an information item on an appliance registered by the user 10, and then manages the information item with (stores the information item in) the user management table (registration of the appliance) (Step S1202).

Then the usage history managing unit 113 obtains a usage history information item on the appliance registered by the user 10, and then manages the information item with (stores the information item in) a usage history management table (Step S1203).

The usage history managing unit 113 transmits the obtained usage history information item (in other words, the usage history information item stored in the usage history management table) to the server of the service provider (Step S1204).

It is noted that the cloud server of the datacenter operator 110 may provide the user 10 with an information item on each of the appliances or an information item into which the usage history information item is organized. Here the user 10 logs in the cloud server, using the user ID and the password, and checks the usage history information item on each appliance or the organized usage history information item.

[Processing Flow in Information Providing Service by Server]

Figure 23:
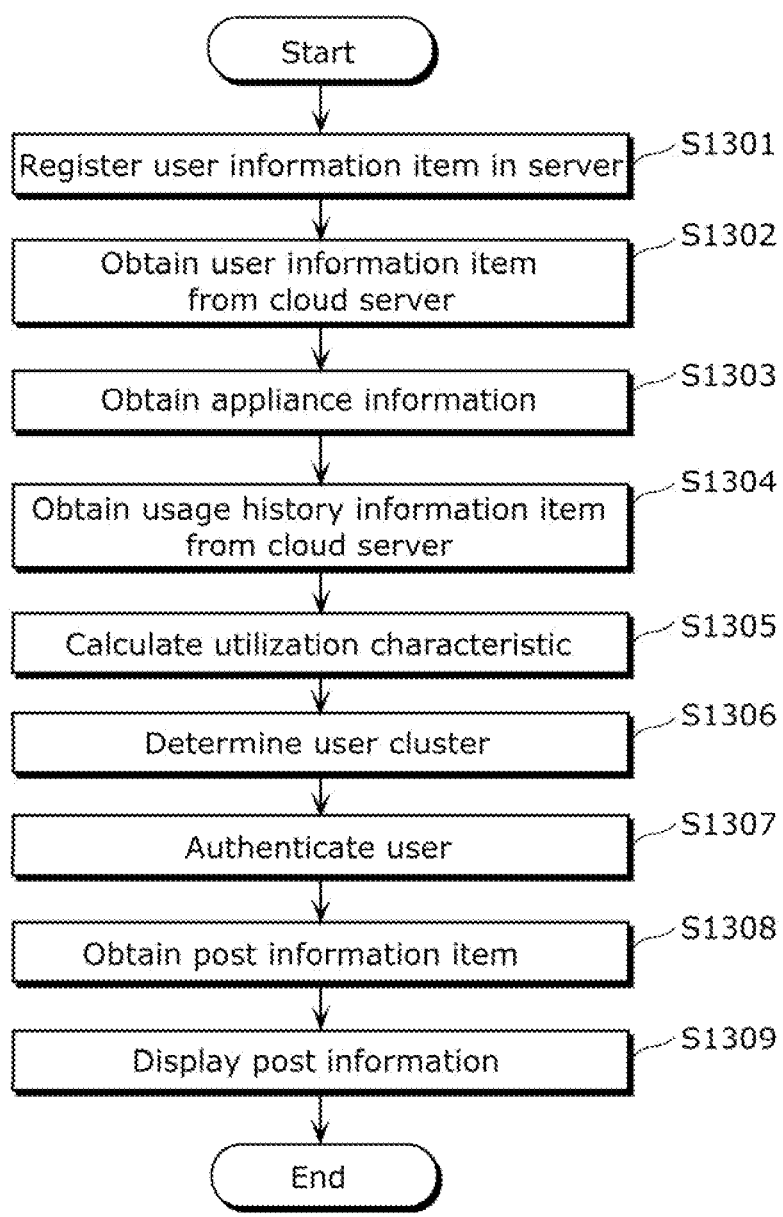
FIG. 23 represents a processing flow of a server according to embodiment.

Described hereinafter is a processing flow in which the server 121 of the service provider 120 provides the above-described message-board service, using the case of the user 10 as an example (see FIG. 23).

In the server 121, the user managing unit 123 obtains, from the appliance C used by the user 10, an information item on the user 10, such as the user ID and the password, and then manages the information item with (stores the information item in a user management table (registration of the user) (Step S1301).

As a third obtainment step, the user managing unit 123 obtains, from the appliance C used by the user 10, a user information item indicating the user 10 himself or herself and registered in the usage history information management service provided by the cloud server 111 of the datacenter operator 110, and associates the user information item registered in the usage history information management service with a user information item registered in the information providing service (Step S1302).

When the association of the user information items ends, the user managing unit 123 obtains an appliance information item which is managed by the cloud server 111 of the datacenter operator 110 and indicating an appliance registered by the user 10 (Step S1303).

As a first obtaining step, the usage history managing unit 124 obtains a usage history information item on the registered appliance from the cloud server, and manages the obtained usage history information item (Step S1304).

As a utilization characteristic calculating step, the utilization characteristic calculating unit 126 calculates a utilization characteristic on each of the appliances, based on the obtained usage history information item (Step S1305).

Based on the calculated utilization characteristic, the user cluster determining unit 127 determines a user cluster for each of the appliances (Step S1306).

The post information managing unit 125 obtains, from the appliance C used by the user 10, the user ID and the password, and authenticates the user 10 based on whether or not the obtained user ID and password match the managed user ID and password (Step S1307).

If the authentication of the user 10 is successful, the post information managing unit 125, as a second obtaining step, obtains, from the appliance C used by the user 10, a post information item such as review information on the appliance A (Step S1308).

As an information displaying step, the display control unit 128 displays, on the message board of the appliance A, the post information item together with a user cluster of the user 10 for the appliance A (Step S1309).

It is noted that exemplified here is the case of the message-board service. In the case of the above-described real-time information sharing service, the processing flow is the same as one from Step S1301 to Step S1307. The rest of the processing flow shall be described below.

If the authentication of the user 10 is successful, the post information managing unit 125 obtains, from the appliance C used by the user 10, a post information item (Step S1308').

The display control unit 128 displays a post information item posted by a user who is followed by the user 10 (the post information item subscribed by the user 10) (Step S1309').

It is noted that, in Step S1301, there are a variety of techniques to associate a user registered in the usage history information management service provided by the cloud server 111 of the datacenter operator 110 with a user registered in the information providing service. An exemplary association will be described below; however, the association shall not be limited to this technique.

For example, if the user has already been registered in the usage history information management service provided from the cloud server 111 of the datacenter operator 110, the user 10 may log in the information providing service using the same user ID and password for the usage history information management service, so that the user to be registered in the usage history information management service may be associated with the user to be registered in the information providing service.

In addition, for example, if the user has already been registered in the usage history information management service provided from the cloud server 111 of the datacenter operator 110, the user 10 may separately register the user ID registered in the usage history information management service, so that the user to be registered in the usage history information management service may be associated with the user to be registered in the information providing service.

It is noted that, in the embodiment, the datacenter operator and the service provider are separated from each other; instead, the datacenter operator may be combined with the service provider. Here, in addition to a user managing unit 112 and a usage history managing unit, the datacenter operator includes a utilization characteristic calculating unit, a user duster determining unit, a post information managing unit, and a display control unit.

[Modification]

(1) Based on utilization characteristics such as (1) the number of uses of a target appliance having a high-end function and of a function which is high in difficulty level, and (ii) the frequency of use for a predetermined period, a use empirical value may be calculated, and, based on the calculated use empirical value, a user cluster such as "beginner", "intermediate", and "advanced (expert)" may be determined for the target appliance or the function.

(2) Based on utilization characteristics such as (i) the number of uses of a target appliance or a target function and (ii) a frequency of use thereof for a predetermined period (most resent and past), a user cluster such as, "non user", "current user", and "past user" may be determined. Here, the "non user" does not use the target appliance or the target function, the "current user" has used the target appliance or the target function in the most resent predetermined period, and the "past user" used the target appliance or the target function in the past but not in the most recent predetermined period.

(3)

The display control unit 128 may display a post information item posted by the user so that the user cluster determined for the user can be identified.

(4) The display control unit 128 may provide a post information item posted by a user to another user who belongs to the same user cluster that the user belongs to.

(5) The embodiment may include a user searching step of searching for a desired user (the same user cluster and a similar user cluster).

(6) A utilization characteristic may be calculated for each of the functions, based on a usage history information item for each function of an appliance, and a user cluster on each function may be determined.

(7) A utilization characteristic may be either an accumulated utilization characteristic from the starting date of use to the present time or a utilization characteristic in a predetermined period such as the most recent period.

(8) When an old appliance is replaced with a new appliance made by the same maker as the old one, the utilization characteristic on the old appliance may be reflected on the utilization characteristic on the new appliance.

(9) A utilization characteristic may be calculated for each of appliance categories including multiple kinds of appliances (such as a recorder, a TV and a recorder, a maker A's recorder, a refrigerator, all of domestic appliances, all of beauty household appliances, etc.) based on a use characteristic on each appliance, and a user cluster may be determined for each category.

(10) In the embodiment, the display control unit 128 displays, in association with each other, a post information item posted by the user and a user cluster of the user; however, the user cluster of the user shall not be the only item to be displayed together with the post information item posted by the user. Instead of the user cluster, a utilization characteristic of the user may be displayed. Hence, displaying a utilization characteristic of the user, instead of the user cluster of the user, is helpful as one of the benchmarks to judge the quality (validity, reliability, usability, and fairness) of the associated and displayed post information item.

(11) In the embodiment, the display control unit 128 displays, in association with one another, a post information item posted by the user, a user information item (poster's name) on the user, and a user cluster of the user; instead, the display control unit 128 does not have to display the user information item on the user on the same screen. In other words, the user can judge the quality of the post information item as far as the display control unit 128 displays the post information item posted by the user and the user cluster of the user on the same screen. Such a feature make the display control unit 128 effective.

(12) In the above embodiment, the utilization characteristic calculating unit 126 calculates a utilization characteristic on a predetermined appliance used by a predetermined user; however, the utilization characteristic shall not be limited to this. The utilization characteristic calculating unit 126 may calculate a utilization characteristic (i) for each kind of a household appliance into which a predetermined appliance used by a predetermined user is classified, and (ii) for each kind of a household appliance into which a predetermined appliance used by the predetermined user is classified and for each maker by which the predetermined appliance is manufactured.

Here, in this case, the user cluster determining unit 127 may determine a user cluster (i) for each kind of a household appliance into which a predetermined appliance used by the predetermined user is classified, and (ii) for each kind of household appliance into which a predetermined appliance used by the predetermined user is classified and for each maker by which the predetermined appliance is manufactured.

(13) An information displaying method may include at least one of the features. In order words, the information displaying control method may include: obtaining, for each of users, usage history information items on one or more appliances used by the user; calculating a utilization characteristic based on a usage history information item on a predetermined appliance among the one or more appliances used by a predetermined user among the users, the utilization characteristic being of the predetermined user using the predetermined appliance, and the usage history information item on the predetermined appliance being obtained in the obtaining of usage history information items; obtaining a post information item posted by the predetermined user; and displaying, in association with each other, (i) a utilization characteristic information item on the utilization characteristic calculated in the calculating and (ii) the post information item posted by the predetermined user, the utilization characteristic being of the predetermined user using the predetermined appliance, and the post information item being obtained in the obtaining of a post information item.

(14) In the above embodiment, each of the constituent elements may be implemented in a form of dedicated hardware. The constituent elements may also be implemented through execution of a software program suitable to each constituent element. Each of the constituent elements may be implemented as a program executing unit, such as a CPU and a processor, which reads out and executes a software program recorded on a recording medium including a hard disk or a semiconductor memory. Here, the program below may be the software that works as units such as the server 121 according to the embodiment.

In order words, the program causes a computer to execute an information displaying method including: obtaining, for each of users, usage history information items on one or more appliances used by the user; calculating a utilization characteristic based on a usage history information item on a predetermined appliance among the one or more appliances used by a predetermined user among the users, the utilization characteristic being of the predetermined user using the predetermined appliance, and the usage history information item on the predetermined appliance being obtained in the obtaining of usage history information items; obtaining a post information item posted by the predetermined user; and displaying, in association with each other, (i) a utilization characteristic information item on the utilization characteristic calculated in the calculating and (ii) the post information item posted by the predetermined user, the utilization characteristic being of the predetermined user using the predetermined appliance, and the post information item being obtained in the obtaining of a post information item.

(15) In addition, the embodiment may be applied to a method for providing the above program.

Other Embodiments

The techniques described in the above embodiment can be implemented in the following types of a cloud service. The types in which the techniques described in the above embodiment, however, shall not be limited to these.

(Service Type 1: Service with Datacenter of One's Own)

Figure 24:
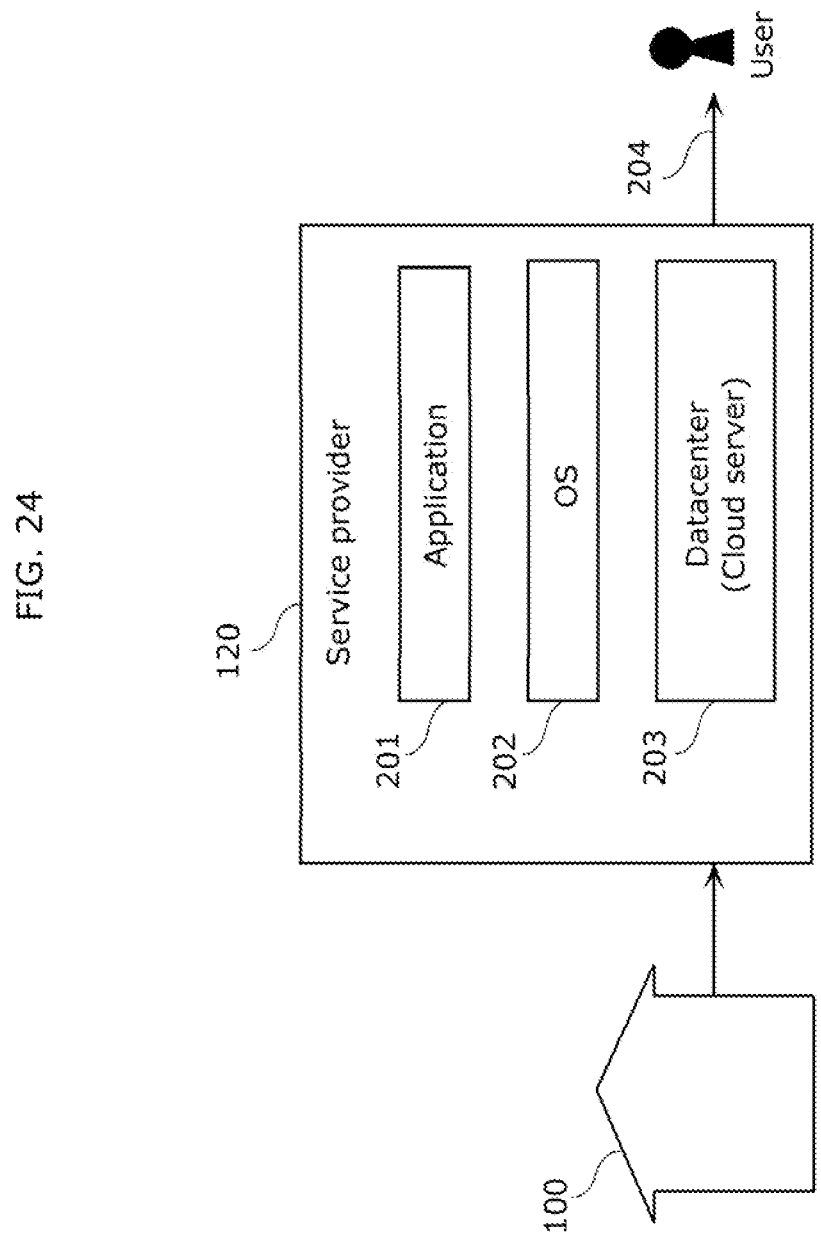
FIG. 24 represents Service Type 1 according to the embodiment.

FIG. 24 represents the Service Type 1 (service with datacenter of one's own). In the Service Type 1, the service provider 120 obtains information from the group 100, and provides the service to a user. In the Service Type 1, the service provider 120 acts as a datacenter operator. In other words, the service provider 120 owns the cloud server 111 for managing big data. Hence there is no datacenter operator.

In the Service Type 1, the service provider 120 operates and manages a datacenter 203 (the cloud server 111). Furthermore, the service provider 120 manages an OS 202 and an application 201. Using the OS 202 and the application 201 managed by the service provider 120, the service provider 120 provides a service illustrated in an arrow 204.

(Service Type 2: IaaS)

Figure 25:
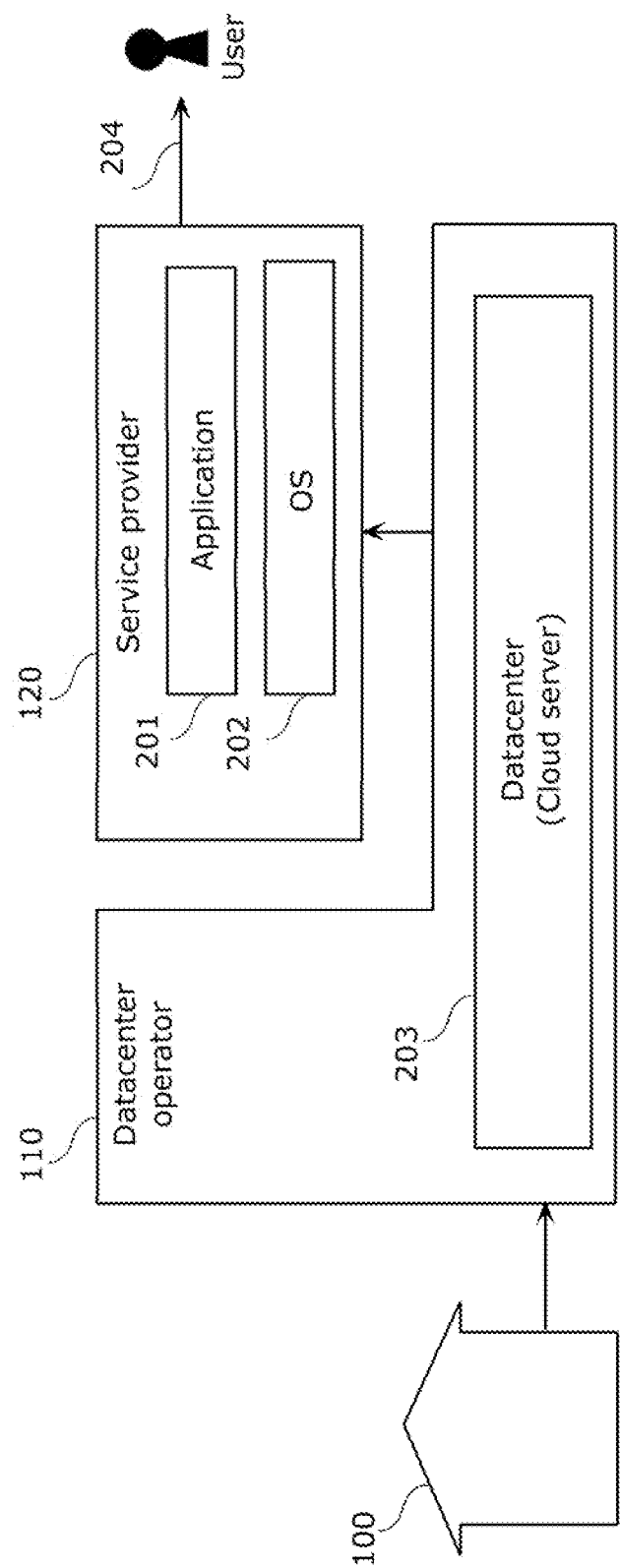
FIG. 25 represents Service Type 2 according to the embodiment.

FIG. 25 represents the Service Type 2 (IaaS). Here, IaaS, an abbreviation for Infrastructure as a Service, is a model for providing a cloud service which offers, as a service through the Internet, the infrastructure itself for establishing and running a computer system.

In the Service Type 2, the datacenter operator 110 operates and manages the datacenter 203 (the cloud server 111). Furthermore, the service provider 120 manages an OS 202 and an application 201. Using the OS 202 and the application 201 managed by the service provider 120, the service provider 120 provides a service illustrated in the arrow 204.

(Service Type 3: PaaS)

Figure 26:
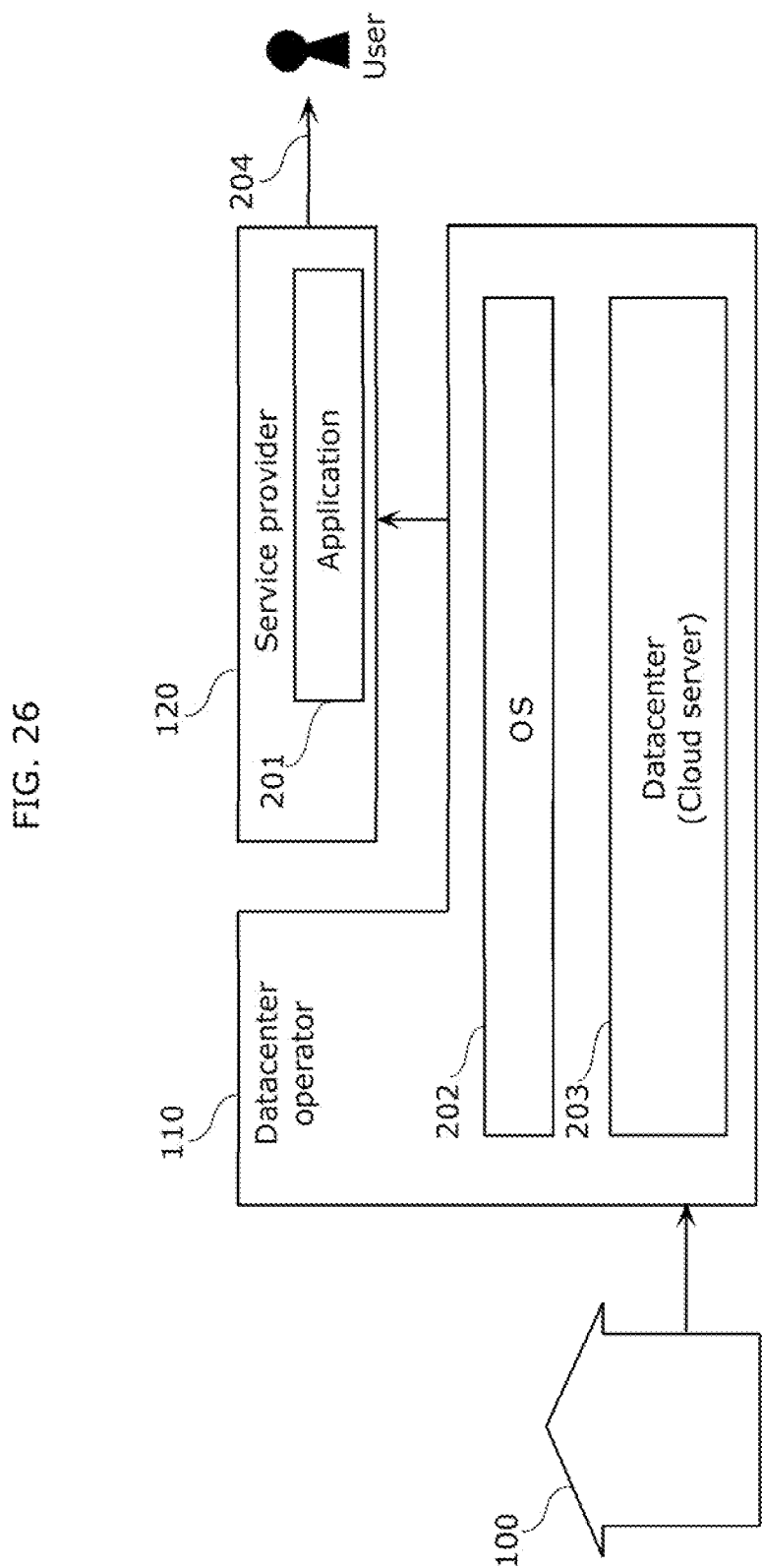
FIG. 26 represents Service Type 3 according to the embodiment.

FIG. 26 represents the Service Type 3 (PaaS). Here, PaaS, an abbreviation for Platform as a Service, is a model for providing a cloud service which offers, as a service through the Internet, a platform for establishing and running software.

In the Service Type 3, the datacenter operator 110 manages the OS 202, and operates and manages the datacenter 203 (the cloud server 111). In addition, the service provider 120 manages the application 201. Using the OS 202 and the application 201 respectively managed by the datacenter operator 110 and the service provider 120, the service provider 120 provides a service illustrated in the arrow 204. (Service Type 4: SaaS)

FIG. 27 represents the Service Type 4 (SaaS). Here, Saas is an abbreviation for Software as a Service. For example, Saas is a model for providing a cloud service which allows companies and individuals (users) that do not own a datacenter (cloud server) to use applications provided by a platform provider who owns a datacenter (cloud server) through a network such as the Internet.

In the Service Type 4, the datacenter operator 110 manages the application 201 and the OS 202, and operates and manages the datacenter 203 (the cloud server 111). The service provider 120 provides a service represented with the arrow 204, using the OS 202 and the application 201 managed by the datacenter operator 110.

In any of the above types, the service provider 120 is to provide a service. Moreover, for example, the service provider 120 or the datacenter operator 110 may either develop an OS, an application, or a database of big data by themselves, or outsource such a development.

Although one or more implementations of an information displaying method according to an exemplary embodiment of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

An information displaying method of the present invention is useful for a message board, a social network service etc. which provide post information regarding an appliance and are capable of displaying utilization characteristic information that is useful as one of the benchmarks to judge the quality (validity, reliability, usability, and fairness) of the post information.

REFERENCE SIGNS LIST 10, 20, 30 User
100, 200, 300 Group
101, 301 Appliance group
102 Home gateway
110 Datacenter operator
111 Cloud server
112 User managing unit
113 Usage history managing unit
120 Service provider
121 Server
122 Information obtaining unit
123 User managing unit
124 Usage history managing unit
125 Post information managing unit
126 Utilization characteristic calculating unit
127 User cluster determining unit
128 Display control unit
201 Application
202 OS
203 Datacenter
204 Arrow
901 Identification information

The invention claimed is:

1. An information displaying method for a service provider server, the service provider server including a non-transitory computer-readable recording medium storing an information displaying program for causing the service provider server to execute the information displaying method comprising:
　　obtaining, for each of users of one or more appliances, usage history information items for the one or more appliances, the usage history information items being obtain from the one or more appliances over a network to which the one or more appliances and the service provider server are connected;
　　calculating a utilization characteristic based on a usage history information item obtained for each of the one or more appliances used by a predetermined user among the users, the utilization characteristic being related to use of the one or more appliances by the predetermined user;
　　obtaining, from a first input device, one or more post information items posted by the predetermined user via the first input device, each of the one or more post information items containing review information characterizing the use of a predetermined appliance among the one or more appliances used by the predetermined user, the one or more post information items obtained being stored in a server;
　　generating (i) a utilization characteristic information item calculated from the utilization characteristic for the one or more appliances used by the predetermined user and (ii) the one or more post information items posted by the predetermined user for the predetermined appliance;
　　determining a user cluster to which the predetermined user using the predetermined appliance belongs, the user cluster being for the predetermined appliance and being determined based on the utilization characteristic of the predetermined user of the predetermined appliance, the user cluster also including other users having similar utilization characteristics for the predetermined appliance, the user cluster of the predetermined user using the predetermined appliance and the post information item posted by the predetermined user are associated with each other;
　　obtaining an appliance among the predetermined appliances or a user cluster among the determined user clusters, selected using a second input device;
　　searching for only a post information item associated with a specific user cluster identified from the appliance or the user cluster selected; and
　　displaying, as a group on a same screen of a display device, (i) one or more post information items found in the search and (ii) identification information for the specific user cluster,
　　wherein, in the displaying, based on a similarity between (i) an appliance registered by a user who uses the second input device or (ii) a user cluster for the appliance registered and (iii) the predetermined appliance or (iv) a user cluster for the predetermined appliance, the one or more post information items found in the search having a higher similarity is given priority to be displayed on a higher level in display order.

2. The information displaying method according to claim 1, further comprising
　　obtaining user information items, each for one of the users, on the users, wherein, in the displaying, the utilization characteristic information item on the predetermined user using the predetermined appliance and a user information item on the predetermined user are further displayed in association with each other, the user information item being obtained in the obtaining user information items.

3. The information displaying method according to claim 1,
wherein, in the displaying, the user cluster of the predetermined user using the predetermined appliance and the post information item posted by the predetermined user are displayed in association with each other, the user cluster representing the utilization characteristic information item and being determined in the determining.

4. The information displaying method according to claim 3,
wherein, in the calculating, frequency of use is calculated as the utilization characteristic of predetermined user using the predetermined appliance, the frequency of use indicating how often the predetermined appliance is used in a predetermined period, and
in the determining, the user cluster is determined based on the frequency of use, calculated in the calculating, of the predetermined appliance in the predetermined period.

5. The information displaying method according to claim 4,
wherein the predetermined period is either (i) an accumulated use period between a starting date of use of the predetermined appliance and a present time or (ii) a most recent use period between the present time and a time point which is back from the present time for a predetermined period.

6. The information displaying method according to claim 3,
wherein, in the calculating, a disproportion information item is calculated as the utilization characteristic of the predetermined user using the predetermined appliance, the disproportion information item indicating how each of functions of the predetermined appliance is disproportionally used, and
in the determining, the user cluster is determined based on the disproportion information item calculated in the calculating and indicating how each of the functions of the predetermined appliance is disproportionally used.

7. The information displaying method according to claim 3,
wherein, in the calculating, a disproportion information item is calculated as the utilization characteristic of the predetermined user using the predetermined appliance, the disproportion information item indicating in which time period the predetermined appliance is disproportionately used, and
in the determining, the user cluster is determined based on the disproportion information item calculated in the calculating and indicating in which time period the predetermined appliance is disproportionately used.

8. The information displaying method according to claim 3,
wherein, in the calculating, a starting date of use of the predetermined appliance is calculated as the utilization characteristic of the predetermined user using the predetermined appliance, and
in the determining, the user cluster is determined based on the starting date of use, of the predetermined appliance, calculated in the calculating.

9. The information displaying method according to claim 3,
wherein, when the predetermined user uses an appliance group including the one or more appliances,
in the determining, the user cluster of the predetermined user using the appliance group is determined based on the utilization characteristic calculated in the calculating, the user cluster determined for each of the one or more appliances included in the appliance group used by the predetermined user.

10. The information displaying method according to claim 3,
wherein, in the determining, the user cluster of the predetermined user using the predetermined appliance is determined based (i) on the utilization characteristic of the predetermined user using the predetermined appliance, and (ii) on utilization characteristics on the predetermined appliance for all users using the predetermined appliance, the utilization characteristic and the utilization characteristics being calculated in the calculating.

11. The information displaying method according to claim 3,
wherein, in the displaying, either (i) the same screen displays the post information item posted by the predetermined user and the user cluster, determined in the determining, of the predetermined user using the predetermined appliance, or (ii) a screen for displaying the post information item posted by the predetermined user and a screen for displaying the user cluster switchably appear.

12. The information displaying method according to claim 3,
wherein, in the displaying, based on the user cluster, a post information item which is most suitable to the predetermined user is further displayed from among post information items posted by the users.

13. The information displaying method according to claim 1, further comprising
obtaining an input information item inputted using an input device, the input information item indicating the specific user cluster for the specific appliance,
wherein, in the displaying, only a post information item in a specific user cluster for a specific appliance is searched for based on the input information item, and a result of the search is further displayed.

14. The information displaying method according to claim 3,
wherein, in the displaying, either (i) the same screen displays the user information item on the predetermined user and the user cluster, determined in the determining, of the predetermined user using the predetermined appliance, or (ii) a screen for displaying the user information item on the predetermined user and a screen for displaying the user cluster switchably appear.

15. The information displaying method according to claim 3,
wherein, further in the displaying, based on the user cluster, a user information item which is most suitable to the predetermined user is displayed from among user information items on the users.

16. The information displaying method according to claim 3, further comprising
obtaining an input information item inputted by the predetermined user, wherein, further in the displaying, the user information items on the users are searched based on the input information and the user cluster, and a result of the search is displayed.

17. An information displaying system including a service provider server, the service provider server including a non-transitory computer-readable recording medium storing an information displaying program for causing the service provider server to:

obtain, for each of users of one or more appliances via a first input device, (i) usage history information items for the one or more appliances used and (ii) one or more post information items posted by the users, the one or more post information items obtained are stored in a server and each of the one or more post information items containing review information characterizing the use of a predetermined appliance, and the usage history information items and the one or more post information item being obtained over a network to which the one or more appliances and the service provider server are connected;

calculate a utilization characteristic, based on a usage history information item obtained from each of the one or more appliances used by a predetermined user among the users, the utilization characteristic being related to use of the one or more appliances by the predetermined user;

generate (i) a utilization characteristic information item calculated from the utilization characteristic for the one or more appliances used by the predetermined user and (ii) the one or more post information items posted by the predetermined user for the predetermined appliance;

determine a user cluster to which the predetermined user using the predetermined appliance belongs, the user cluster being for the predetermined appliance and being determined based on the utilization characteristic of the predetermined user of the predetermined appliance, the user cluster also including other users having similar utilization characteristics for the predetermined appliance, the user cluster of the predetermined user using the predetermined appliance and the post information item posted by the predetermined user are associated with each other;

obtain an appliance among the predetermined appliances or a user cluster among the determined user clusters, selected using a second input device;

search for only a post information item associated with a specific user cluster identified from the appliance or the user cluster selected; and display, as a group on a same screen of a display device, (i) one or more post information items found in the search and (ii) identification information for the specific user cluster, wherein, in the displaying, based on a similarity between (i) an appliance registered by a user who uses the second input device or (ii) a user cluster for the appliance registered and (iii) the predetermined appliance or (iv) a user cluster for the predetermined appliance, the one or more post information items found in the search having a higher similarity is given priority to be displayed on a higher level in display order.

18. A non-transitory computer-readable recording medium for use in a computer, the non-transitory computer-readable recording medium storing an information displaying program for causing a computer to execute steps comprising:

obtaining, for each of users of one or more appliances, usage history information items for the one or more appliances, the usage history information items being obtain from the one or more appliances over a network to which the one or more appliances and the service provider server are connected;

calculating a utilization characteristic based on a usage history information item obtained for each of the one or more appliances used by a predetermined user among the users, the utilization characteristic being related to use of the one or more appliances by the predetermined user;

obtaining, from a first input device, one or more post information items posted by the predetermined user via the first input device, each of the one or more post information items containing review information characterizing the use of a predetermined appliance among the one or more appliances used by the predetermined user, the one or more post information items obtained being stored in a server;

generating (i) a utilization characteristic information item calculated from the utilization characteristic for the one or more appliances used by the predetermined user and (ii) the one or more post information items posted by the predetermined user for the predetermined appliance;

determining a user cluster to which the predetermined user using the predetermined appliance belongs, the user cluster being for the predetermined appliance and being determined based on the utilization characteristic of the predetermined user of the predetermined appliance, the user cluster also including other users having similar utilization characteristics for the predetermined appliance, the user cluster of the predetermined user using the predetermined appliance and the post information item posted by the predetermined user are associated with each other;

obtaining an appliance among the predetermined appliances or a user cluster among the determined user clusters, selected using a second input device;

searching for only a post information item associated with a specific user cluster identified from the appliance or the user cluster selected; and displaying, as a group on a same screen of a display device, (i) one or more post information items found in the search and (ii) identification information for the specific user cluster, wherein, in the displaying, based on a similarity between (i) an appliance registered by a user who uses the second input device or (ii) a user cluster for the appliance registered and (iii) the predetermined appliance or (iv) a user cluster for the predetermined appliance, the one or more post information items found in the search having a higher similarity is given priority to be displayed on a higher level in display order.

19. The information displaying method according to claim 1, wherein the identification information for the user cluster is a benchmark for judging a degree of quality of a post information item.

20. The information displaying method according to claim 1, wherein the specific user cluster is a user cluster that corresponds to a utilization characteristic ranked higher than a utilization characteristic corresponding to a user cluster to which a predetermined user belongs.

21. The information displaying method according to claim 1, wherein the specific user cluster is a user cluster that is identical, close, or similar to a user cluster to which a predetermined user belongs.

* * * * *